(12) United States Patent  (10) Patent No.: US 7,831,048 B2
Kastella et al.  (45) Date of Patent: Nov. 9, 2010

(54) SECURE QUANTUM KEY DISTRIBUTION USING ENTANGLED PHOTONS

(75) Inventors: Keith Kastella, Gregory, MI (US); Ralph S. Conti, Ypsilanti, MI (US); Kenneth A. Augustyn, Plymouth, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 1601 days.

(21) Appl. No.: 11/013,946

(22) Filed: Dec. 17, 2004

(65) Prior Publication Data

US 2005/0135620 A1  Jun. 23, 2005

Related U.S. Application Data

(60) Provisional application No. 60/529,743, filed on Dec. 17, 2003.

(51) Int. Cl.
 *H04L 9/00* (2006.01)
(52) U.S. Cl. ..................... 380/256; 380/278
(58) Field of Classification Search ............... 380/255, 380/256, 263, 277; 398/183
 See application file for complete search history.

(56) References Cited

U.S. PATENT DOCUMENTS

| 4,225,938 | A | | 9/1980 | Turpin |
| 4,286,328 | A | | 8/1981 | Bocker |
| 4,369,363 | A | * | 1/1983 | Quint et al. ............... 250/214.1 |
| 4,468,093 | A | | 8/1984 | Brown |
| 4,633,427 | A | | 12/1986 | Bocker |
| 5,339,182 | A | | 8/1994 | Kimble et al. |
| 5,420,905 | A | | 5/1995 | Bertozzi |
| 5,515,438 | A | | 5/1996 | Bennett et al. |
| 5,796,477 | A | * | 8/1998 | Teich et al. ................. 356/318 |
| 5,917,322 | A | | 6/1999 | Gershenfeld et al. |
| 6,057,541 | A | | 5/2000 | Steenblik |
| 6,252,665 | B1 | | 6/2001 | Williams et al. |
| 6,272,224 | B1 | | 8/2001 | Mazourenko et al. |
| 6,289,104 | B1 | | 9/2001 | Patterson et al. |
| 6,314,189 | B1 | | 11/2001 | Motoyoshi et al. |
| 6,424,665 | B1 | * | 7/2002 | Kwiat et al. .................. 372/21 |
| 6,430,345 | B1 | | 8/2002 | Dultz et al. |

(Continued)

FOREIGN PATENT DOCUMENTS

EP  1091240  4/2001

(Continued)

OTHER PUBLICATIONS

Strekalov et al., Two-photon processes in faint biphoton fields, pp. 1-18, downloaded Mar. 9, 2005, http://arxiv.org.

(Continued)

*Primary Examiner*—Jung Kim
*Assistant Examiner*—Samson B Lemma
(74) *Attorney, Agent, or Firm*—Hunton & Williams LLP

(57) ABSTRACT

A system and method of implementing quantum key distribution are provided that possess increased data rates and enhanced security. These increased data rates are provided through the use of biphotons. Through encoding bits of information on the intra-biphoton delay time and enabling separate polarization bases for each of the photons comprising each biphoton, the system and method increase data bandwidth available for quantum key distribution.

18 Claims, 11 Drawing Sheets

U.S. PATENT DOCUMENTS

| | | | |
|---|---|---|---|
| 6,444,999 | B1 | 9/2002 | Tomita |
| 6,473,719 | B1 | 10/2002 | Steenblik |
| 6,480,283 | B1 | 11/2002 | Williams et al. |
| 6,522,749 | B2 | 2/2003 | Wang |
| 6,646,727 | B2 | 11/2003 | Saleh et al. |
| 6,678,054 | B1 | 1/2004 | Dress et al. |
| 2002/0018290 | A1 | 2/2002 | Birk et al. |
| 2002/0020819 | A1 | 2/2002 | Wolleschensky et al. |
| 2002/0036775 | A1 | 3/2002 | Wolleschensky et al. |
| 2002/0093632 | A1 | 7/2002 | Teich et al. |
| 2002/0097874 | A1* | 7/2002 | Foden et al. ............. 380/256 |
| 2002/0109840 | A1 | 8/2002 | Wolleschensky et al. |
| 2002/0140941 | A1 | 10/2002 | Pedigo |
| 2003/0002670 | A1 | 1/2003 | Wang |
| 2003/0086138 | A1 | 5/2003 | Pittman et al. |
| 2004/0036877 | A1 | 2/2004 | Sergienko et al. |
| 2004/0208638 | A1* | 10/2004 | Jansen .................. 398/183 |
| 2004/0258421 | A1* | 12/2004 | Conti et al. ............. 398/183 |
| 2005/0094818 | A1* | 5/2005 | Inoue et al. ............. 380/278 |

FOREIGN PATENT DOCUMENTS

| | | |
|---|---|---|
| WO | WO 02/45468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Enzer et al., Entangled-photon six-state quantum cryptography, New Journal of Physics 4 (2002) 45.1-45.8.
Gatti et al., Multi-photon, multi-mode polarization entanglement in parametric down-conversion, pp. 1-22 (download date unknown), http://arxiv.org.
Bouwmeester et al., Experimental quantum teleportation, Nature, vol. 390, Dec. 11, 1997, pp. 575-579.
Sciarrino et al., Delayed-choice entanglement swapping with vacuum-one-photon quantum states, Physical Review A, 66, 024309 (2002).
Sergienko et al., Quantum cryptography with femtosecond parametric down conversion, Quantum Imaging Laboratory, pp. 1-8.
Altepeter et al., Ancilla-assisted quantum process tomography, Physical Review Letters, vol. 90, No. 19, May 16, 2003, 193601- to 193601-4.
O'Neil, Quantum information studies, Department of Experimental Physics, {http://www.may.ie/academic/physics/quantum.shtml}, printed Feb. 25, 2004, 2 pages.
Giacomini et al., Active teleportation of a quantum bit, Physical Review A, 66, 030302(R) (2000).
Jost et al., Spatial correlations of spontaneously down-converted photon pairs detected with a single-photon-sensitive CCD camera, Optics Express 81, Jul. 20, 1998, vol. 3, No. 2.
Caetano et al., Quantum image control through polarization entanglement in parametric down-conversion, Physical Review A 68, 023805 (2003).
Barbosa, Twin photons entangled in polarization and angular momentum, Eur. Phys. J. D22, 433-440 (2003).
Ribeiro et al., Image and coherence transfer in the stimulated down-conversion process, Physical Review A, vol. 60, No. 6, Dec. 1999, 5074-5078.
Monken et al., Transfer of angular spectrum and image formation in spontaneous parametric down-conversion, Physical Review A, vol. 57, No. 4, Apr. 1998, 3123-3126.
Ribeiro et al., Observation of image transfer and phase conjugation in stimulated down-conversion, Physical Review Letters, vol. 87, No. 13, Sep. 24, 2001, 133602-1 to 133602-4.
Fonseca et al., Quantum interference by a nonlocal double slit, Physical Review A, vol. 60, No. 2, Aug. 1999, 1530-1533.
Atature et al., Entanglement in cascaded-crsytal parametric down-conversion, Physical Review Letters, vol. 86, No. 18, Apr. 30, 2001, 4013-4016.

White et al., Nonmaximally entangled states: production, characterization, and utilization, Physical Review Letters, vol. 83, No. 16, Oct. 18, 1999, 3103-3107.
Kwiat et al., Ultrabright source of polarization-entangled photons, Physical Review A, vol. 60, No. 2, Aug. 1999, 773-776.
Kwiat et al., Experimental entanglement distillation and "hidden" non-locality, Letter to Nature, 1014-1017, 2001.
Grover, Quantum computers can search arbitrarily large databases by a single query, Physical Review Letters vol. 79, No. 23, Dec. 8, 1997, 4709-4712.
Berthiaume et al., The quantum challenge to structural complexity theory, 132-137.
Ekert et al., Quantum computation and Shor's factoring algorithm, Reviews of Modern Physics, vol. 68, No. 3, Jul. 1996, 733-753.
Blum, Density matrix theory and applications, 1-217, 1981.
Zhang et al., Experimental and theoretical aspects of quantum teleportation, Center for Engineering Science Advanced Research, 9 pages.
Abouraddy et al., Degree of entanglement for two qubits, Physical Review A, vol. 64, 050101-1 to 050101-4.
Semat et al., Introduction to Atomic and Nuclear Physics, Fifth Edition, Chp. 7, Elements of quantum mechanics, 186-215.
Ekert, Quantum cryptography based on Bell's theorem, Physical Review Letters, vol. 67, No. 6, Aug. 5, 1991, 661-663.
Schenker, A quantum leap in codes for secure transmissions, International Herald Tribune, printed Apr. 12, 2004, {http://www.iht.com/articles/126822.html}, 3 pages.
Johnson, Magiq employs quantum technology for secure encryption, Advanced Technology, printed Apr. 12, 2004 {http://www.eetimes.com/at/news/OEG20021105S0019}, 3 pages.
McCulagh, Start-up makes quantum leap into cryptography, C/NET News.com, printed Apr. 12, 2004, {http://news.com.com/2100-1029-5103373.html}, 3 pages.
Scully et al., Two-photon scheme for detecting the Bell basis using atomic coherence, Physical Review Letters, vol. 83, No. 21, Nov. 22, 1999, 4433-4436.
Braunstein et al., Dense coding for continuous variables, Physical Review A, vol. 61, 042302-1 to 04302-4.
Santos et al., Measurement of the degree of polarization entanglement through position interference, Physical Review A, vol. 64, 023804-1 to 023804-6.
Saleh et al., Entangled-photon virtual-state spectroscopy, Physical Review Letters, vol. 80, No. 16, Apr. 20, 1998, 3483-3486.
Oberparleiter et al., Optics Communications, 183 (2000) 133-137.
Georgiades et al., Nonclassical excitation for atoms in a squeezed vacuum, Physical Review Letters, vol. 75, No. 19, Nov. 6, 1995, 3426-3429.
Joobeur et al., Spatiotemporal coherence properties of entangled light beams generated by parametric down-conversion, Physical Review A , vol. 50, No. 4, Oct. 1994, 3349-3361.
Nasr et al., Biphoton focusing for two-photon excitation, Physical Review A, vol. 65, 023816-1 to 023816-6.
Abouraddy et al., Role of entanglement in two-photon imaging, Physical Review Letters, vol. 87, No. 12, Sep. 17, 2001, 123602-1 to 123602-4.
Boeuf et al., Calculating characteristics of non-collinear phase-matching in uniaxial biaxial crystals, Optical Technology Division, pp. 1-24.
Abouraddy et al., Double-slit interference of biphotons generated in spontaneous parametric downconversion from a thick crystal, Journal of Optics B: Quantum and Semiclassical Optics 3, 2001, S50-S54.
Kwiat et al., Experimental verification of decoherence-free subspaces, Science, vol. 290, Oct. 20, 2000, 498-500.
Naik et al., Entangled state quantum cryptography: eavesdropping on the Eckert protocol, Physical Review Letters, vol. 84, No. 20, May 15, 2000, 4733-4736.
Yabushita et al., Spectroscopy by frequency entangled photon pairs, pp. 1-11(download date unknown), http://arxiv.org.
Perina et al., Multiphoton absorption cross section and virtual-state spectroscopy for the entangled $n$ -photon state, Physical Review A, vol. 57, No. 5, May 1998, pp. 3972-3986.

Fei et al., Entangled-induced two-photon transparency, Physical Review Letters, vol. 78, No. 9, Mar. 3, 1997, pp. 1679-1682.

Yabushita et al., Spectroscopy by frequency entangled photon pairs, Physical Review A 69. 013806-1-013806-4 (2004).

Kurtsiefer et al., High-efficiency entangled photon pair collection in type-II parametric fluorescence, Physical Review A, vol. 64, 023802-1 to 023802-4.

Jost et al., Spatial correlations of spontaneously down-converted photon pairs detected with a single-photon-sensitive CCD camera, Optics Express, Jul. 20, 1998, vol. 3, No. 2, pp. 81-88.

Almeida et al., Transmission of quantum images through long distances, pp. 1-4, (download date unknown), http://arxiv.org.

Caetano et al., Quantum Physics, Abstract, Image formation by manipulation of the entangled angular spectrum, pp. 1-5, (download date unknown), http://arxiv.org.

Zavatta, Premio Italgas/Italgas Prize Energy and Environment 16$^{th}$ Edition, Summary of the Thesis "Debut in the World of Research".

Rubin et al., Theory of two-photon entanglement in type-II optical parametric down-conversion, Physical Review A, vol. 50, No. 6, Dec. 1994, pp. 5122-5133.

Rarity et al., Experimental demonstration of single photon rangefinding using parametric downconversion, Applied Optics, vol. 29, No. 19, Jul. 1, 1990, pp. 2939-2943.

Waks et al., Security of quantum key distribution with entangled photons against individual attacks, Physical Review A, vol. 65, 052310-1 to 052310-16, 2002.

Ribeiro et al., Observation of image transfer and phase conjugation in stimulated down-conversion, pp. 1-6, (download date unknown), http://arxiv.org.

Caetano et al., Image-polarization entanglement in parametric down-conversion, 4 pages.

Ribeiro et al., Image and coherence transfer in the stimulated down-conversion process, pp. 1-5, (download date unknown), http://arxiv.org.

Caetano et al., Quantum distillation of position entanglement with the polarization degrees of freedom, ScienceDirect, Optics Communications, Mar. 3, 2004, (www.sciencedirect.com/science).

Law et al., Analysis and Interpretation of High Transverse Entanglement in Optical Parametric Down Conversion, Physical Review Letters, vol. 92, No. 12, Mar. 26, 2004.

O'Sullivan-Hale et al., Pixel Entanglement: Experimental Realization of Optically Entangled $d=3$ and $d=6$ Qudits, Physical Review Letters, vol. 92, No. 12, Jun. 10, 2005.

* cited by examiner

SECURE QUANTUM KEY DISTRIBUTION USING ENTANGLED PHOTONS

RELATED APPLICATIONS

The present application is related to U.S. patent application Ser. No. 10/850,394, filed May 21, 2004, entitled "System and Method of Detecting Entangled Photons" to Kastella et al., and to U.S. patent application Ser. No. 10/849,789, filed May 21, 2004, entitled "Quantum Steganography" to Conti et al., the disclosures of which are expressly incorporated by reference herein in their entireties. The present application claims priority to U.S. Provisional Patent Application No. 60/529,743, filed Dec. 17, 2003.

FIELD OF THE INVENTION

The present invention relates to the field of quantum key distribution and to methods and systems that utilize entangled photons.

BACKGROUND OF THE INVENTION

The objective of cryptographic key distribution is to enable two users who share no secret information initially, to agree on a key (e.g., a string of random bits), which enables them to form and transmit encrypted messages, while limiting a potential eavesdropper to information about a vanishingly small fraction of the key. The key may be used as a "one time pad," to encrypt a message. Alternately, or in addition, the key may be used in one or more cryptographic algorithms, such as DES, Triple-DES, IDEA, or AES/Rijndael. Additional applications include using the key in one or more electronic message signature, validation, or authentication schemes.

To facilitate description of various key distribution techniques, this specification employs the convention of using "Alice" to designate a key information sender, "Bob" to designate a key information receiver, and "Eve" to designate an eavesdropper. Under this convention, messages may be sent both from Alice to Bob and from Bob to Alice. Thus, Bob may transmit key information to Alice, in addition to Alice transmitting key information to Bob.

Advancing research and experimental investigation of fundamental problems of quantum mechanics have led to a methodology for secure communications: quantum cryptography. At the heart of this technique lies the distribution of a cryptographic key whose security is guaranteed by the principles of quantum mechanics. With Quantum Key Distribution (QKD), two users, Alice and Bob, agree on a secret key using a communications channel capable of transmitting sequences of quantum states. Due to the Heisenberg uncertainty principle, it is not possible to accurately monitor these sequences without disturbing them in a way that can be readily detected by the legitimate users of the channel. After the transmission of a quantum sequence between Alice and Bob across this channel, Alice and Bob exchange messages through a second channel, called the public channel. Alice and Bob communicate across this public channel to assess the amount of disturbance in the transmission of the quantum sequence to determine the extent of noise and eavesdropping. If it is determined statistically that eavesdropping has not occurred, Alice and Bob select a body of information from the transmitted sequence in order to form a key that, with a high probability, is known only to the two of them and not to an eavesdropper, Eve. In QKD, the private quantum channel is combined with a public classical channel to create a conduit with high overall security. A variety of QKD protocols are known, such as BB84, B92, 4+2, Six State, Ekert scheme, and Goldenberg/Vaidman class.

Two photons quantum-mechanically entangled together are referred to as an entangled-photon pair, or biphoton. Traditionally, the two photons comprising a biphoton are called "signal" and "idler" photons. The designation of which photon is referred to as "signal" and which is referred to as "idler" is arbitrary. The photons in an entangled photon pair have a connection between their respective properties. Measuring properties of one photon of an entangled-photon pair determines properties of the other photon, even if the two photons are separated by a distance. As understood by those of ordinary skill in the art and by way of non-limiting example, the quantum mechanical state of an entangled-photon pair cannot be factored into a tensor product of two individual quantum states.

SUMMARY OF THE INVENTION

Embodiments of the present invention provide novel systems and methods to implement quantum key distribution that possess increased data rates and enhanced security. These increased data rates are provided through the use of biphotons. Embodiments of the present invention increase the data bandwidth for quantum key distribution by encoding bits of information on one or more of: a delay time between the signal photon and idler photon comprising a biphoton, polarizations of the signal photon and idler photon comprising a biphoton, and polarization bases of the signal photon and idler photon comprising a biphoton.

According to an embodiment of the invention, a system for quantum distribution of private information is provided. The system includes a sending unit that encodes at least one bit onto a time delay, the time delay being between a propagation of two photons comprising a biphoton. The system also includes a receiving unit that detects the at least one bit on a received biphoton transmitted from the sending unit.

Various additional features of the above-described embodiment include the following. At the at least one bit may be cryptographic key information. The sending unit may impart a separate basis polarization to each photon comprising the biphoton. The sending unit may impart a separate polarization bit to each photon comprising the biphoton. The time delay may be introduced through lengthening a propagation distance of a photon comprising one of the biphotons. The receiving unit may further comprise a coincidence detector.

According to another embodiment of the invention, a transmission unit for communicating private information is provided. The system includes a generator for creating a plurality of biphotons. The system also includes a time delay unit that introduces, for each biphoton, a relative time delay between the two photons comprising the biphoton. The system also includes a basis polarizing unit that selects a polarization basis for each biphoton.

Various additional features of the above-described embodiment include the following. The relative time delay may represent cryptographic key information. The basis polarizing unit may randomly impart one of a linear polarization and a circular polarization.

According to another embodiment of the invention, a biphoton configured to store information for transmission over a communications channel is provided. The biphoton comprises a first photon and a second photon, where the first photon being entangled with the second photon. The biphoton further includes at least one of a time delay between the first photon and the second photon, the time delay representing at least one bit of information, and a pair of polarizations, each of the pair of polarizations manifested on one of the first photon and the second photon, the pair of polarizations representing at least one bit of information. The biphoton is intended to be used for one of cryptographic key distribution, encryption, decryption, and authentication.

According to another embodiment of the invention, a method for communicating secret information is provided. The method includes generating a plurality of entangled photons. The method also includes creating a time delay in the propagation of two photons, where the time delay represents at least one bit of information. The method also includes transmitting the plurality of entangled photons. The method also includes detecting the time delay on received entangled photons. The method also includes forming cryptographic information from the at least one bit of information.

An additional feature of the above-described embodiment is that the method may include imparting a separate basis polarization to each photon comprising the entangled photons.

According to another embodiment of the invention, a sequence of messages for communicating private information is provided. A message is transmitted over a communications channel. A message is transmitted over a communications channel, the message being comprised of a plurality of biphotons, each biphoton encoded with at least one polarization. A basis message is transmitted over a communications channel relating to a basis of each of a subset of the biphotons received by a receiver. A confirmation message is transmitted over a communications channel relating to a matching basis for a subset of the biphotons.

According to another embodiment of the invention, a system for quantum key distribution is provided. The system includes a sending unit that imparts a bit onto a biphoton through polarization and imparts a polarization basis on each the two photons forming the biphoton. The system also includes a receiving unit that detects the bit on a received biphoton transmitted from the sending unit, the receiving unit selecting a basis for each of the photons forming the received biphoton.

BRIEF DESCRIPTION OF THE DRAWINGS

The novel features that are considered characteristic of the invention are set forth with particularity in the appended claims. The invention itself, however, both as to its structure and operation together with the additional objects and advantages thereof are best understood through the following description of exemplary embodiments of the present invention when read in conjunction with the accompanying drawings.

DETAILED DESCRIPTION OF THE INVENTION

Generally, in QKD schemes, there is a tradeoff between rate of transmission of the key and its security, the latter being measured by the fraction of the key Eve can intercept. In some embodiments of the present invention, a biphoton sensitive material allows for a high-rate quantum key distribution. Maximizing the quantum key transmission rate is important because the encryption key may be used in a Vernam cipher (also known as a one-time pad). The Vernam cipher is perfectly secure only when the length of the key and the length of the message are the same. However, unless the system is operated with equal key and message lengths, there is a trade between security and data rate. The entanglement properties of biphotons can potentially be exploited to enhance secure quantum key transmission rates in two ways: by encoding extra bits of information in the relative timing and polarization of the biphoton pair, and by increasing the rate at which biphotons can be securely sent.

Some embodiments of the present invention employ a biphoton sensitive material, which generally responds only to biphotons. In such embodiments, the receiver is insensitive to ambient light, even if it is the same frequency (color) as the biphotons or their constituent photons. This allows for free-space transmission of the biphotons without interference from other light sources.

Figure 1:
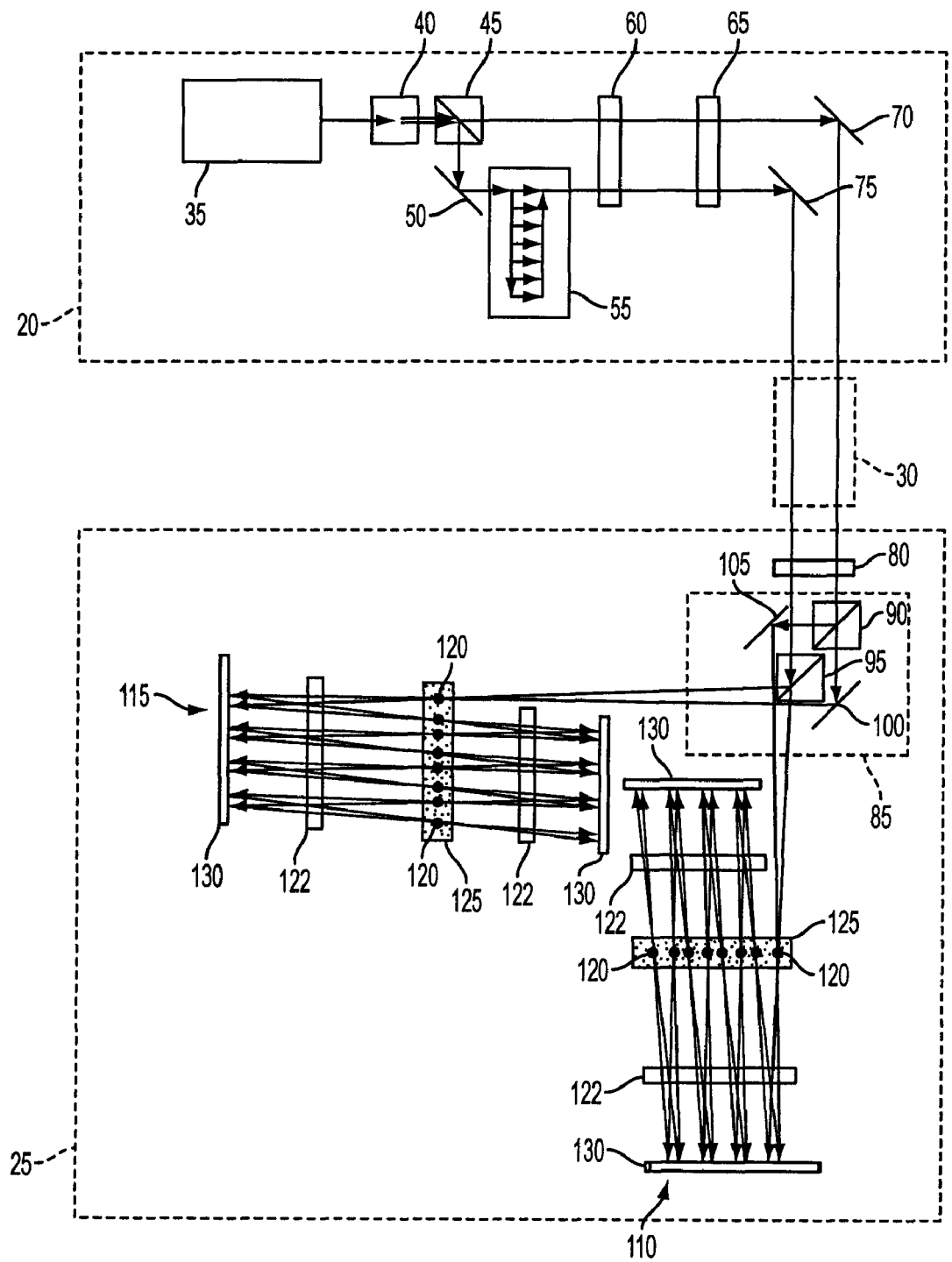
FIG. 1 is a block diagram of a first exemplary quantum key distribution embodiment.

FIG. 1 illustrates an embodiment of a quantum key distribution system. The apparatus is composed of three primary components, a sender 20, a receiver 25, and a communications channel 30. Sender 20 is designed to produce, manipulate, and transmit biphotons. Receiver 25 detects and records the states of the biphotons transmitted by sender 20.

Communications channel 30 is a medium that supports the transmission of biphotons. For instance, an optic fiber can support the transmission of biphotons and function as the medium of communications channel 30. Air and space are other media through which biphotons can propagate, thereby allowing for wireless transmissions of biphotons. Other media that support the transmission of biphotons can function in combination with sender 20 and receiver 25; the above examples are not exhaustive.

Sender 20 produces non-entangled, i.e., classical, light through the use of a laser 35. The light from this laser is directed to Parametric Down Converter (PDC) 40 in order to create biphotons. In this embodiment, sender 20 utilizes type II parametric down conversion in order to generate biphotons. PDC 40 includes, by way of non-limiting example, a beta-barium borate (BBO) crystal that converts single photons into biphotons through collinear type II parametric down-conversion. Type II parametric down conversion, also referred to as Spontaneous Parametric Down Conversion (SPDC), provides a reliable and robust system for producing biphotons. Together, laser 35 and PDC 40 produce the biphotons that sender 20 utilizes in order to effect QKD. Other techniques for generating biphotons may be used. For example, Type-I down conversion may be used.

Sender 20 manipulates the biphotons in order to impart information for transmission to receiver 25. This information for QKD is cryptographic information that may be used to form a cryptographic key. The biphotons are passed through a Polarizing Beam Splitter (PBS) 45, which separates each biphoton into its constituent signal and idler photons that propagate in different directions for separate manipulations. Note that this spatial separation of the photons does not break the quantum entanglement that exists between them. After each biphoton is passed through PBS 45, the photons remain entangled.

Figure 1A:
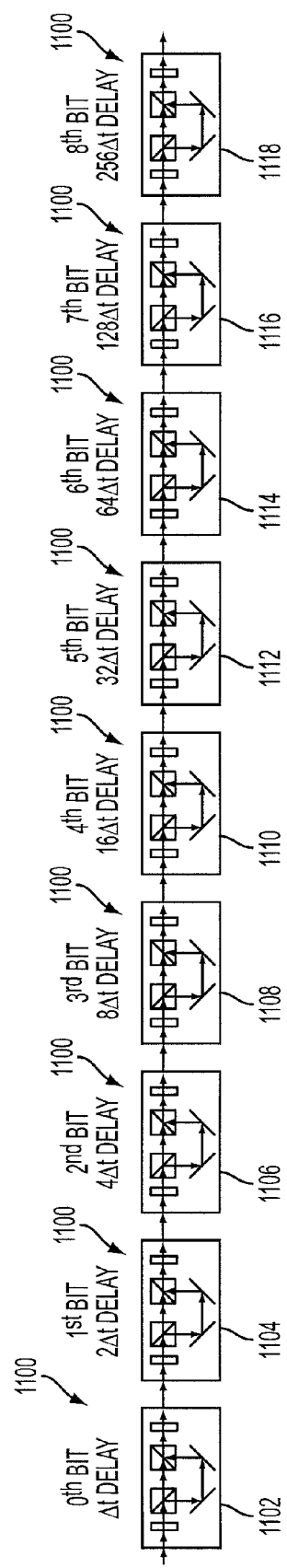
FIG. 1A is a schematic diagram illustrating a photon delay embodiment.
Figure 1B:
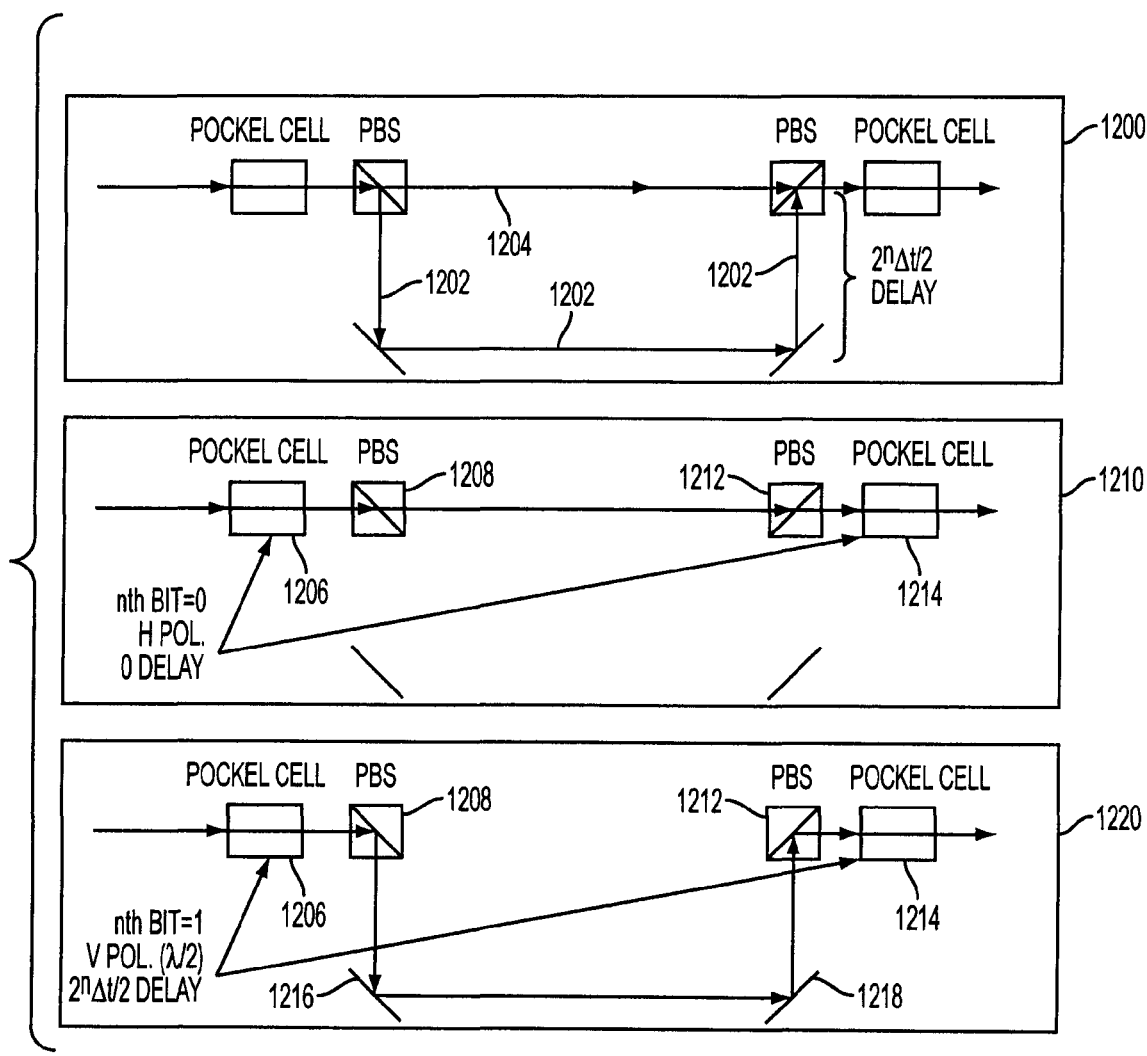
FIG. 1B is a schematic diagram illustrating a portion of the embodiment of FIG. 1A.

The idler photon is directed from PBS 45 to a mirror 50 where it is reflected into a photon delay 55. Photon delay 55 introduces a relative time delay between the propagation of the signal and idler photons by delaying the propagation of the idler photon to a polarization selector 60. There are a variety of ways to increase the time it takes for the idler photon to reach polarization selector 60 relative to the propagation of the-signal photon. One method is through directing the idler photon through an electro-optic media having an index of refraction that varies with an applied voltage. Varying the voltage across the media varies the media's index of refraction, thereby altering the speed and time of the idler photon's propagation through the media and imparting a time delay byte. Another embodiment of photon delay 55 is depicted in FIGS. 1A and 1B described below.

The manipulation of a time delay between the idler and signal photons in each biphoton enables sender 20 to impart information onto the time delay of the biphoton. This information is a time delay byte, which is a piece of information that corresponds to the length of the time delay. This time delay byte may have multiple bits of information. Exemplary sizes for the time delay byte include 5-10 bits. However, a byte may be any number of bits. Through introducing selectable time delays into the biphoton, it is possible to send multiple bits of information with the transmission of a single biphoton. To create an n-bit time delay byte, photon delay 55 is capable of selectably imparting one of $2^n$ different time delays. With the electro-optic crystal whose index of refraction varies with applied voltage, it is possible to impart $2^n$ different time delays by applying $2^n$ different voltages across the electro-optic crystal. Alternately, with a linear array of Pockel cells and PBS devices, n pairs of Pockel cells and PBSs can impart $2^n$ different time delays. To make the information contained on the time delay byte random for use in a cryptographic system, a random number generator randomly produces a number that corresponds to one of the $2^n$ time delays in photon delay 55. Photon delay 55 thus imparts the time delay representing the random number onto the biphoton through varying the voltage across the electro-optic media, through altering the Pockel cell switches in the linear array, or by other techniques, depending on the specific embodiment.

The signal photon propagates directly from PBS 45 to polarization selector 60. Polarization selector 60 includes, by way of non-limiting example, a half-wave plate that selectively rotates the polarization of the signal and idler photons by 90°. Polarization selector 60 is thus a controllable half-wave phase shifter capable of converting vertical polarization to horizontal polarization and vice versa. The idler photon reaches polarization selector 60 after traveling through photon delay 55. Polarization selector 60 sets a polarization configuration of the biphoton to one of two states in order to impart a bit onto the biphoton. Such a bit is encoded in the polarization of the individual signal and idler photons. This polarization bit may be either a "0" or a "1." To encode this information, polarization selector 60 selects either a vertical or horizontal polarization for the signal and idler photons. By way of non-limiting example, the combination of a signal photon with a horizontal polarization and an idler photon with a vertical polarization may represent a "1." The combination of a signal photon with a vertical polarization with an idler photon with a horizontal polarization may represent a "0." Other encodings are also possible. Encoding more than one bit is also possible.

From polarization selector 60, the biphoton propagates to a basis selector 65. Basis selector 65 selects a basis randomly for the biphoton. Two exemplary bases are linear and circular polarization. Each of these bases has several different states. For example, a linear polarization basis may include horizontal and vertical states, and a circular polarization basis may include clockwise and counterclockwise states. Basis selector 65 includes, by way of non-limiting example, a quarter-wave plate that selectively shifts the polarization of the signal and idler photons by a quarter wave. Basis selector 65 is thus a controllable quarter-wave phase shifter, capable of converting linear polarization to circular polarization and vice versa. Basis selector 65 randomly selects whether to leave the linear polarization basis of the biphoton unaffected, or to convert it to a circular polarization basis. Thus, the states of one basis are either left alone or converted to the states of another basis. By way of non-limiting example, horizontal polarization may get converted to left circular polarization and vertical polarization may get converted to right circular polarization, or vice versa. A Pockel cell that introduces a quarter-wave shift when activated and no shift when inactivated may be used for this purpose. With circular polarization, a biphoton that has a horizontally polarized signal photon and a vertically polarized idler photon could have its polarization changed to, by way of non-limiting example, left circular polarization for the signal photon and right circular polarization for the idler photon. Alternatively, basis selector 65 may let the biphoton having vertical and horizontal polarizations pass through unaffected. Basis selector 65 thus selects the biphoton's signal photon and idler photon basis, but essentially leaves the relative difference in polarization between the signal photon and idler photon unchanged. The information encoded in the states of one basis is therefore preserved when those states are converted into a different basis. Moreover, basis selector 65 leaves the polarization information of each biphoton bit unchanged.

The choice of basis for each photon can be thought of as being a bit. Such a basis bit is encoded in the choice of linear or circular basis. For example, a biphoton with linearly polarized signal and idler photons, i.e., linear basis, can be thought of as encoding a "0," whereas a biphoton with circularly polarized signal and idler photons, i.e., circular basis, can be thought of as encoding a "1." This basis bit thus indicates which basis is used, but is independent of the particular states in that basis. The basis is used to test the security of the sequence of biphotons transmitted between sender 20 and receiver 25.

The idler and signal photons emerge from basis selector 65 and propagate towards mirrors 70 and 75. Mirrors 70 and 75 direct the propagation of the signal and idler photons into communications channel 30.

In sum, sender 20 encodes a plurality of information in various forms into each biphoton in a stream of biphotons. Initially, laser 35 sends a stream of photons into PDC 40, which are converted into a stream of biphotons. Together, photon delay 55, polarization selector 60, and basis selector 65 are able to impart a time delay byte, polarization bit, and basis choice onto a biphoton. With photon delay 55 and polarization selector 60, and basis selector 65, this stream of biphotons is randomly manipulated to impart time delay bytes, polarization bits, and basis choices onto each biphoton. Consequently, the stream of biphotons is transformed into a sequence bearing quantum key information upon individual biphotons pairs carrying a delay byte and polarization bit.

Through the introduction of this time delay byte, the information carrying capacity of the biphoton is increased over that of a photon that just holds a bit through polarization. Consequently, the introduction of the time delay byte increases the bandwidth of information carried by a stream of biphotons.

Sender 20 is synchronized with receiver 25, allowing for propagation time of the biphotons. Sender 20 and receiver 25 are preferably synchronized through the use of a global clock, such as one provided by the Global Positioning System (GPS). When sender 20 transmits the sequence of biphotons over communications channel 30 to receiver 25, the period of transmission is divided into time bins of equal length. Preferably, one biphoton is transmitted in a single time bin. As a result, sender 20 and receiver 25 can identify and track specific biphotons with the sequence of time bins. However, some time bins may not include any biphoton, and some time bins may include more than one biphoton. The choice of rate of biphoton production is a function of at least the desired bandwidth of information and relative security. Preferably, the probability that an individual time bin contains a biphoton is much less than one (by way of non-limiting example, such a probability may be 0.1).

Receiver 25 receives the sequence of biphotons transmitted over communications channel 30. Receiver 25 detects the polarization states of the received biphotons forming the transmitted sequence from sender 20. However, receiver 25 does not know which basis to measure the states with. Using one basis to measure states in a different basis will produce random results. When biphotons reach receiver 25, the incoming pairs encounter basis selector 80. Basis selector 80 randomly selects a polarization basis for detecting the biphoton. Basis selector 80 is used to guess at the basis polarization imparted onto each biphoton by sender 20. Because, in the present embodiment, there are two choices for the basis, linear or circular, basis selector 80 will incorrectly select the basis of the biphoton approximately one-half of the time. If basis selector 80 randomly guesses that the incoming pair has circular polarization, it will attempt to convert the biphoton to have linear polarization. If basis selector 80 randomly guesses that the basis of the incoming biphoton is linear, it will do nothing, thereby leaving the biphoton with the polarization imparted by basis selector 65, regardless of whether it is linear or circular polarization.

The two photons forming each biphoton are separated into idler and signal photons by polarizing beam splitter 45. In order to detect the relative time delay and read the relative time delay byte imparted onto each biphoton, a photon recombination system 85 is employed with receiver 25. Photon recombination system 85 employs a pair of polarizing beam splitters 90 and 95, as well as mirrors 100 and 105 in order to direct the stream of idler and signal photons along coincident paths towards a pair of detectors 110 and 115. Beam splitter 90 and mirrors 100 and 105 divide and direct the stream of signal photons into a pair of paths coincident with the paths of the idler photons that are split by beam splitter 95. As discussed in detail below, detectors 110 and 115 respectively detect biphotons with "1" and "0" polarization bits.

Detectors 110 and 115 detect biphotons as an entangled, two-photon transition in a series of interaction regions. Each region is arranged so that arriving photons have different delays between the horizontally-polarized photons and the vertically-polarized photons. That is, each region is separated from the previous region by optics that delays one photon of each biphoton pair. These detectors are preferably optically thick to biphotons that arrive simultaneously within the entanglement time and are transparent to all other combinations.

Detectors 110 and 115 are able to sense entangled biphotons through the use of a Biphoton Sensitive Material ("BSM") 120 that is housed within an atomic vapor cell 125. BSM 120 is formed as a linear array of regions illustrated as "spots" within atomic vapor cell 125. A pair of mirrors 130 reflect the stream of biphotons through successive regions forming the linear array BSM 120 housed within atomic vapor cell 125.

BSM 120 absorbs biphotons under certain conditions. The absorption of biphotons causes BSM 120 to fluoresce. BSM 120 fluoresces only when the biphoton arrives inside of the entanglement time $T_e$. Each biphoton has an entanglement time $T_e$. BSM 120 is transparent to biphotons that arrive outside entanglement time $T_e$. Only those biphotons that arrive with a time delay shorter than the entanglement time $T_e$ are absorbed by BSM 120, causing it to fluoresce. Biphoton absorption is also referred to as Entangled Two-Photon Absorption ("ETPA") as well as biphoton absorption. The molecules forming BSM 120 produce a fluorophoton in response to absorbing entangled photon pairs. This emitted fluorophoton strikes a Charge Coupled Device ("CCD"), photomultiplier tube ("PMT"), or other acceptable device (not shown) that detects the fluorophoton, thereby indicating that a biphoton was absorbed by BSM 120. The CCD is coupled to a computer that tracks and records the fluorophotons that impact the CCD.

Although BSM 120 absorbs entangled photon pairs thereby producing fluorescence, BSM 120 does not generally absorb other types of photons. BSM 120 generally does not absorb and fluoresce in response to absorption except for biphotons whose constituent signal and idler photons arrive within the entanglement time of each-other. Other types of photons and biphotons generally do not cause BSM 120 to fluoresce, and therefore do not register on the CCD. Thus, BSM 120 is effectively transparent to such other types of photons and biphotons. These other types of photons can include random photons, which may consist of individual or multiple photons that may or may not be entangled with other photons. Random photons can also include multiple photons that are not entangled with any other photons. Individual photons are generally not absorbed by BSM 120; BSM 120 is effectively transparent to individual photons. Thus, even if random photons or biphotons with a long inter-photon delay reach detectors 110 and 115, they will not register. Embodiments of the present invention that employ a BSM are therefore virtually immune from interference from other light sources. Such embodiments may be used to transmit and receive biphotons encoding information in high ambient light conditions, even if the ambient light contains photons the same frequency as the signal photons, idler photons, and initial laser photons. These embodiments are particularly useful for transmission through air or space. Additionally, the ability to detect biphotons and only biphotons increases security.

Detectors 110 and 115 provide a system whereby the random polarization bits and time delay bytes contained on the biphotons transmitted from sender 20 are detected and read. The computer connected to the CCDs of detectors 110 and 115 records the fluorescence patterns and thereby recovers information from the sequence of biphotons. This information is recorded in a manner such that each biphoton has an associated numeric identity corresponding to its time bin, a delay byte, and a polarization bit. The numeric identity of a biphoton corresponds to the placement of a particular biphoton within the biphoton sequence. For instance, the 25th biphoton emitted from sender 20 will arrive in a particular time bin, say the n-th time bin, and thereby have the number n as its associated numeric identity. Note that for this example of the 25th biphoton emitted, n might be larger than 25 (where, on average, less than one biphoton is emitted in each time bin) or smaller than 25 (where, on average, more than one biphoton is emitted in each time bin). Preferably, however, less than one biphoton is emitted in each time bin on average. By way of non-limiting example, a biphoton may be emitted in a given time bin with a selectable probability of, e.g., 0.1.

For BSM 120 to detect biphotons with different delay bytes, a pair of birefringent phase delay filters 122 are used to delay the propagation of the signal photon relative to the idler photon. BSM 120 detects quantum entangled biphotons when the pairs arrive at a BSM region 120 within the entanglement time $T_e$. As a biphoton enters either detector 110 or 115, the pair is reflected against mirrors 130 a plurality of times through the linear array of regions of BSM 120 in vapor cell 125. Each time the biphoton passes between mirrors 130 and BSM 120, it passes through one of the two birefringent phase delay filters 122. With each pass through birefringent phase delay filter 122, the signal photon is increasingly delayed with respect to the idler photon. Once the signal photon is sufficiently delayed such that the time delay between the signal and idler photon is less than the entanglement time $T_e$, the biphoton will be detected by the following region in the linear array of regions of BSM 120 and cause it to fluoresce. Consequently, the particular region that fluoresces in the linear array of regions of BSM 120 identifies the time delay byte that was imparted to the biphoton by sender 20.

Referring, for example, to detector 115, a biphoton will pass from photon recombination system 85 to a first region in the linear array of regions of BSM 120 without encountering either of birefringent phase delay filters 122. If this first region in the linear array fluoresces, then the time delay byte imparted to the biphoton is one that is represented by zero time delay. As the biphoton is reflected against mirror 130 as it propagates from the first region in the linear array forming BSM 120 to the second region, it passes through birefringent phase delay filter 122 twice, thereby slowing down one photon of the pair thus reducing the relative time delay between the signal and idler photons by one unit of time delay. If the second region in the linear array of BSM 120 fluoresces when the biphoton reaches it, then the biphoton initially carried a delay byte represented by one unit of time delay. This process of reflection by mirrors 130 and reduction of the time delay by one unit of time by birefringent phase delays 122 continues until the signal and idler photons have a relative time delay less than the entanglement time $T_e$. The location of fluorescence within array of BSM 120 regions therefore indicates the time delay byte. Detector 110 operates in essentially the same manner as detector 115. For a time delay byte composed of n bits of information, detectors 110 and 115 each have $2^n$ regions in the linear array of BSM 120 to detect the $2^n$ possible time delays imparted by photon delay 55.

Together, sender 20, communications channel 30, and receiver 25 respectively function to transmit, carry, and detect a sequence composed of a series of biphotons that each individually carry a delay byte and a polarization bit. Through exploiting the time delay between the signal and idler photons, sender 20 increases the bandwidth of the sequence transmitted between sender 20 and receiver 25. A sequence composed entirely of biphotons that are each only carrying a polarization bit carries one bit of information per photon pair. With the introduction of the time delay and addition of the delay byte to each photon pair, each individual biphoton carries 1+n bits of information, where n is the number of bits in the time delay byte. Hence, with the introduction of the delay byte, the bandwidth of the sequence produced from sender 20 is increased. With the introduction of a basis selector and addition of a basis bit, each individual photon carries 2+n bits: n bits in the time delay byte, one polarization bit, and one basis bit. Note that the size of the byte forming the time delay byte may vary from zero to n bits of information, where n may be as large as ten or more.

Referring again to detectors 110 and 115, photon recombination system 85 utilizes beam splitters 90 and 95 to separate the incoming biphotons through the use of polarization. The use of polarization enables photon system 85 to separate the incoming biphotons based upon whether they carry a "1" or a "0" polarization bit. Polarization selector 60 in sender 20 polarizes the idler and signal photons to encode a polarization bit of information. This polarization bit from polarization selector 60 is what polarizing beam splitters 90 and 95 act upon when separating the streams of incoming idler and signal photons. Consequently, the streams of idler and signal photons received by receiver 25 are separated into streams of biphotons carrying a "0" polarization bit and those carrying a "1" polarization bit. The biphotons carrying the "1" polarization bit are directed towards detector 110. The biphotons carrying a "0" polarization bit are directed toward detector 115. As a result, detector 110 detects and measures the delay bytes of all of the "1" polarization bit biphotons, and detector 115 detects and measures the delay bytes of all of the "0" polarization bit biphotons.

Basis selector 80 randomly guesses at the basis of the incoming biphotons. Since there are two possible bases in the given example, circular and linear, basis selector 80 will randomly guess the correct basis fifty percent of the time. For the biphotons that basis selector 80 correctly guessed the basis, photon recombination system 85 sorts them based on their linear polarization of carrying either a "1" or "0" polarization bit and directs them to the appropriate detector 110 or 115. Although basis selector 80 will guess the basis correctly approximately fifty percent of the time, basis selector 80 also guesses the wrong basis fifty percent of the time.

For the biphotons that basis selector 80 incorrectly guessed, these biphotons also propagate toward photon system 85. There are two possible directions that the constituent signal photons and idler photons of biphotons whose basis was incorrectly guessed (i.e., those with circular polarization) may travel from photon system 85. Such photons may travel either to detector 110 or 115. These circularly polarized photons will randomly appear either at detector 110 with a probability of ½ (50%) or at detector 115 with a probability of ½ (50%). Therefore, even though basis selector 80 incorrectly guesses the basis of fifty percent of the incoming biphotons, half of the signal and or photons from such incorrectly guessed biphotons will nevertheless travel to the correct detector 110 or 115. Half of the signal or idler photons from incorrectly guessed biphotons will travel to the wrong detector 110 or 115. In sum, a quarter of biphotons whose basis was guessed incorrectly will be correctly detected at their respective detector 110 or 115.

FIG. 1A depicts in detail a photon delay 55 embodiment. This embodiment varies the length of the path of propagation for the idler photon relative to the signal photon through the use of multiple systems 1100 of Pockel cells and PBSs. Each system is capable of selectively imparting a delay by selectively redirecting a photon to an additional length of propagation path. The systems 1102-1118, generally 1100, are placed one after the other in a linear array. With the array of systems 1100, it is possible to controllably vary the distance that the idler photon propagates relative to the signal photon, thereby imparting a time delay byte. In particular, a time delay unit $\Delta t$ is chosen. The first system 1102 is configured to include an additional delay of $\Delta t$ when activated. The second system 1104 is configured to include an additional delay of $2\Delta t$ when activated. More generally, the i-th system 1100 in the array is configured to include an additional delay of $2^{i-1}\Delta t$ when activated. Each system 1100 may be independently activated. Thus, in a photon delay embodiment with m such systems 1100, any delay that is an integer multiple of $\Delta t$, from zero to $2^m \Delta t$ may be obtained. Other systems can introduce time delays such as a configuration of mirrors or array of fiber optic media.

FIG. 1B depicts in detail an exemplary system 1100 of Pockel cells and PBSs. Pockel cells are electro-optic crystals that are used as a switch. Each Pockel cell can switch the polarization of an incoming polarized photon so that the succeeding PBS will either direct the photon through an additional length of path 1202 or let it pass on to the next Pockel cell and PBS system 1100 in the linear array via path 1204. Both paths 1202, 1204 that an incoming photon may take are depicted at 1200. The following assumes for purposes of illustration that system 1100 is the n-th in a serial delay (e.g., 55). At 1210, the system 1100 sets the n-th bit to "0" by allowing an incoming photon to pass through without diverting it to an additional path length. A horizontally-polarized photon passes directly through the first Pockel cell 1206 unchanged, straight through the first 1208 and second 1212 polarizing beam splitters, and through the second Pockel cell 1214, unchanged, at 1210. At 1220, the system 1100 sets the n-th bit to "1" by diverting an incoming photon to an extended path length, thereby effecting a $2^{n-1}\Delta t$ delay. A horizontally-polarized photon is converted to a vertically-polarized photon by the first Pockel cell 1206, directed by the first polarizing beam splitter 1208 to the first 1216 and then second mirror 1218, and on to a second polarizing beam splitter 1212, which directs the photon to a second Pockel cell 1214. The second Pockel cell 1214 converts the vertically-polarized photon back to horizontal polarization, and passes the photon out of system 1100.

Figure 2:
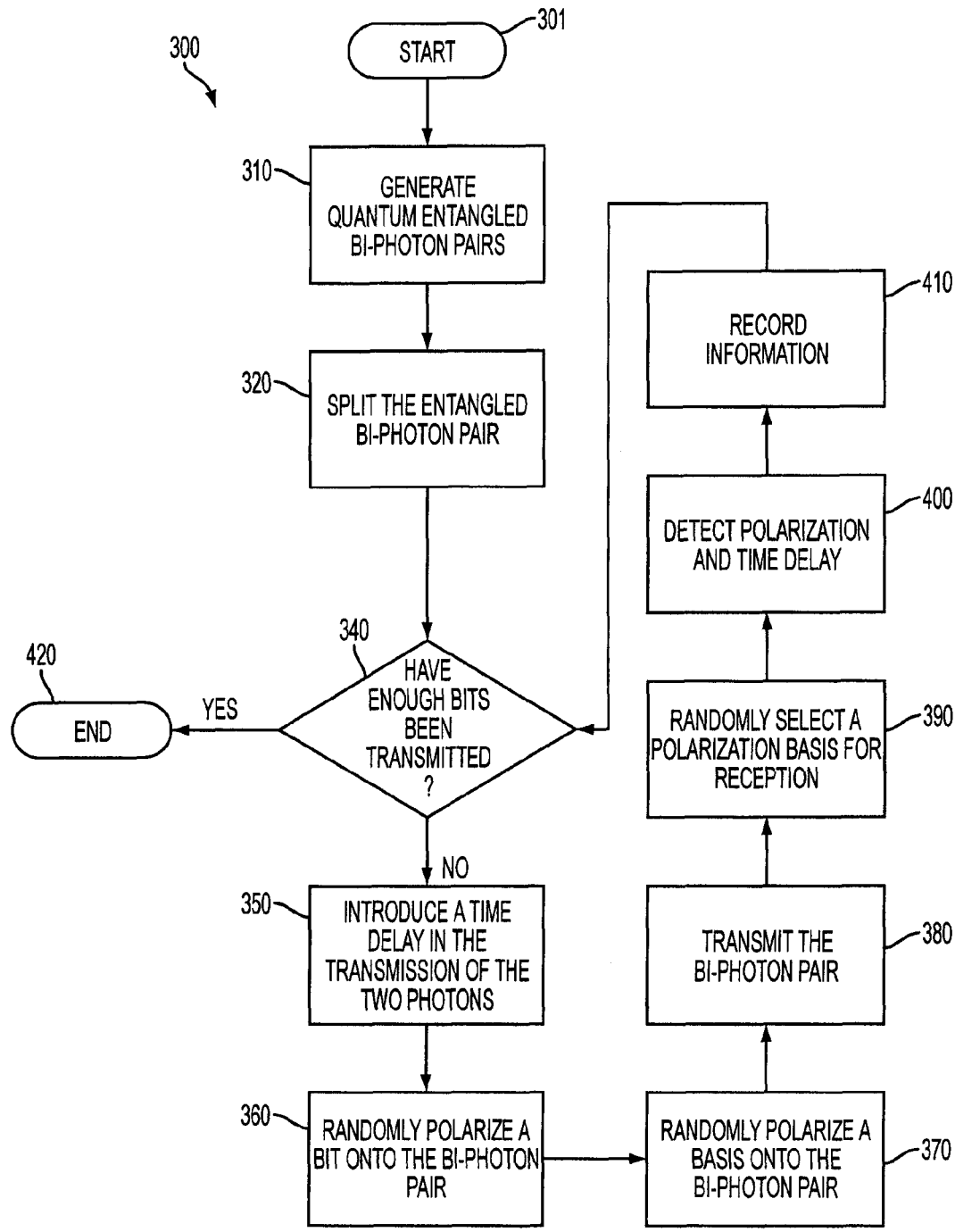
FIG. 2 is a flow chart that depicts a method for quantum key distribution.

FIG. 2 is a flow chart 300 that depicts a method for the creation, transmission, and reception of a sequence of biphotons that supports quantum key distribution. The process begins at step 301 and proceeds to step 310 where a sequence of biphotons are generated using, by way of non-limiting example, laser 35 and PDC 40. In step 320, the signal and idler photons are separated utilizing, by way of non-limiting example, PBS 45. Step 340 checks whether it is likely that enough bits have been received. The decision at 340 is based on at least the desired amount of data to be sent and the rate of biphoton transmission. If step 340 yields a "NO," then control is passed to step 350, where a delay byte is introduced to the biphoton with photon delay 55. If it is likely that enough bits have been received, then the process is passed to end step 420. Alternately, or in addition, the receiver may communicate whether enough bits have been received, using a quantum or classical channel.

In step 360, a random polarization bit is imposed on to the biphoton, using, by way of non-limiting example, polarization selector 60. In step 370, a basis is randomly selected and imposed on the biphoton. Next, the biphoton is transmitted across communications channel 30 in step 380. A basis polarization is randomly guessed for reception of the transmitted biphotons in step 390, by, by way of non-limiting example, receiver 25. In step 400, the polarization bit and delay byte are read by, by way of non-limiting example, detectors 110 and 115, and this information is recorded at step 410. Based upon decision step 340, this process discontinues in step 420 when a sequence of N biphotons has been transmitted.

Figure 3:
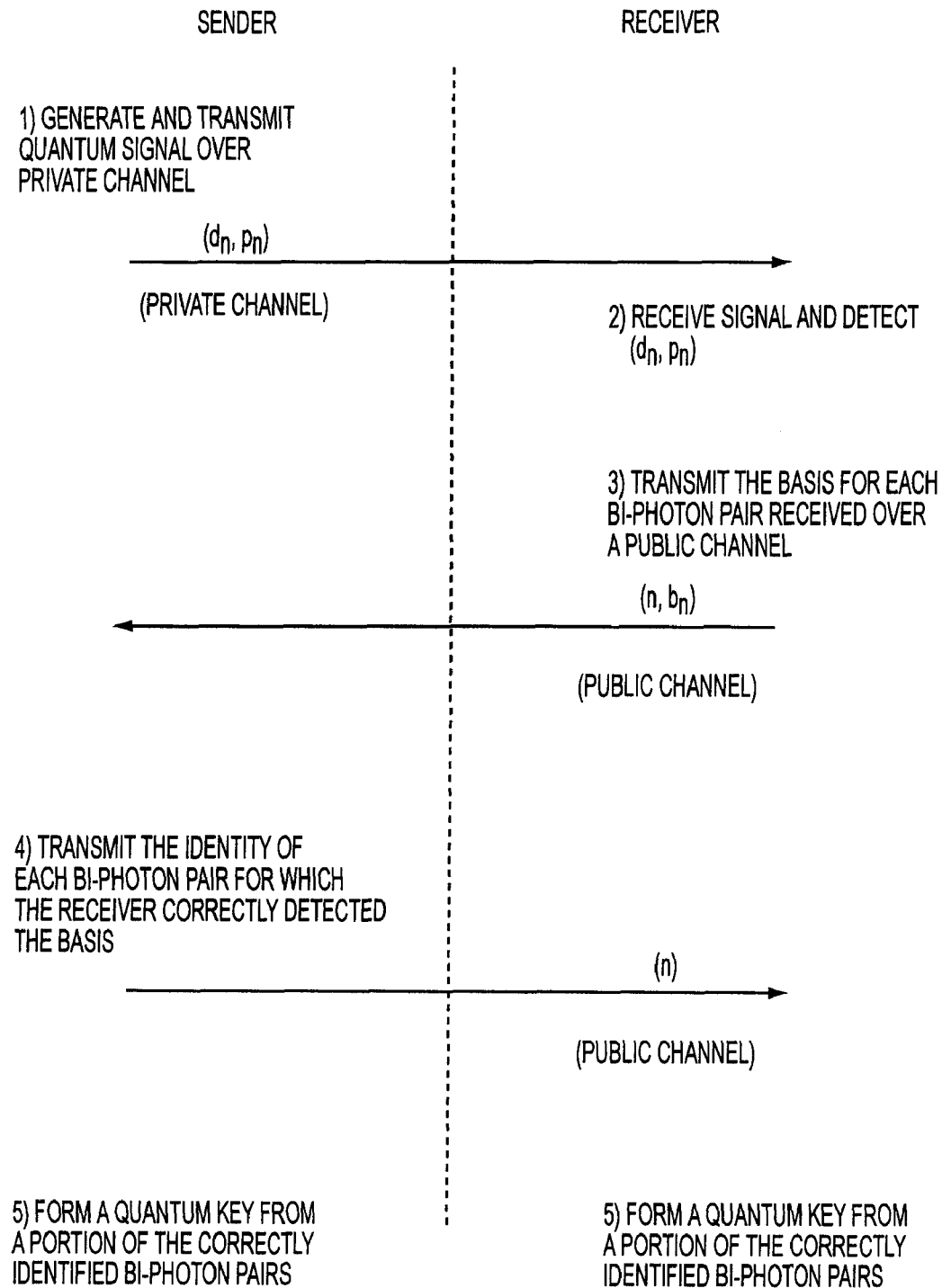
FIG. 3 is a schematic diagram illustrating a protocol for quantum key distribution.

FIG. 3 illustrates a protocol, such as for use in the exemplary system of FIG. 1, for quantum key distribution in which polarization bits are correlated, allowing for a highly secure transmission rate and in which a delay byte is transmitted. By convention and for ease of discussion, sender 20 is referred to as Alice and receiver 25 is referred to as Bob. The objective of this protocol is to enable Alice and Bob, who initially share no common secret information, to share a secret key in such a manner that an eavesdropper Eve would be detected.

Referring to the exemplary embodiment of FIG. 3, in step 1, Alice generates and transmits a sequence of biphotons utilizing sender 20. This sequence is a stream of N biphotons, each of which has a selected basis and is encoded with a polarization bit and delay byte. For the n-th biphoton in the sequence, the polarization bit is denoted $p_n$ and delay byte is denoted $d_n$. Polarization bit $p_n$ carries one bit of information and delay byte $d_n$ carries one or more bits of information. Alice transmits this sequence over a communications channel (e.g., 30) to Bob. The communications channel (e.g., 30) supports the transmission of biphotons.

In step 2, Bob the receiver detects the sequence sent by Alice. Utilizing a receiver (e.g., 25), Bob detects and reads the random information ($p_n$ and $d_n$ for each n<N) from the quantum sequence sent by Alice. Bob will not receive all of the biphotons sent by Alice. Due to various phenomena, not all of the biphotons transmitted by Alice will cross the communications channel (e.g., 30) successfully and reach the receiver (e.g., 25). For those biphotons that do reach Bob, Bob randomly chooses a basis and detects and records the delay byte $d_n$ and the polarization bit $P_n$.

Over a public channel, Bob tells Alice the basis $b_n$ that he used to read each of the biphotons that he received from Alice (n and $b_n$ for n<N). The public channel is different from the private channel used to transmit the quantum sequence from sender 20 to receiver 25. The public channel can be any conventional communications channel such as radio, telephone, wireless, optical, or satellite. Further, the communications across the public channel need not be secure. Since Alice and Bob are only exchanging the information related to the polarization basis and not the actual polarization bits or delay bytes, Alice and Bob are not giving away information that can be used, without more, to form the quantum key. Therefore, Eve will not gain enough key information to generate the secret key used by Bob and Alice by eavesdropping on the communications across the public channel.

In step 4, Alice compares the polarization bases used by Bob to the actual polarization bases that Alice randomly selected for each of the biphotons that were transmitted from the sender (e.g., 20) to the receiver (e.g., 25). In step 4, Alice then tells Bob over the public channel the numeric identity (n) of each of the biphotons for which Bob selected the correct basis. Alice will have transmitted an N biphoton sequence to Bob. A portion of the N biphotons will never be received by Bob. For the biphotons that are received, Bob will select the wrong polarization basis with a polarization selector (e.g., 80) for a portion of the received biphotons. However, Bob will also randomly guess the correct basis for a portion of the received biphotons. In the message transmitted from Alice to Bob in step 4, Bob is told which of the N sent biphotons he has selected the correct basis for. It is from this group of received biphotons for which Bob selected the correct basis that a quantum key is created. The quantum key is created from key information transmitted from Alice to Bob across the private channel (e.g., 30). The key information is composed of any, or a combination, of the delay bytes and polarization bits contained on each of the biphotons for which Bob selected to correct basis.

Once the key information has been collected, Alice and Bob in step 5 go through the process of forming a secret quantum key. Alice and Bob utilize a sequence of error detections on the data in order to eliminate the effects of a noisy channel (e.g., 30). Alice and Bob compare the parity of the publicly agreed subsets of their blocks of key information. If an error is found, the block is subjected to a bisective search. This process continues until the error is found and corresponding bits removed. As a precaution, Alice and Bob preferably discard the last bit in any block in order to prevent information leaking to Eve. This process is repeated a number of times until Alice and Bob are satisfied that the information used to form the key now contains no more errors. The size of the blocks depends upon the frequency with which errors are thought to occur in the channel. With the errors removed from the data, Alice and Bob form the secret quantum key that they can use to form encrypted communications between them.

The protocol of FIG. 3 is further analyzed presently. Consider, by way of non-limiting example, the apparatus of FIG. 1 where a polarization bit and a delay byte are encoded. Each biphoton is encoded with a basis b, a delay byte d, and polarization bit p. Assume by way of non-limiting example that the efficiency of detecting a given biphoton can be low (efficiency $\eta'$ for Bob and $\eta''$ for Eve). Break the time history into bins each $\Delta T$ long and label them in sequence with the integer t. The probability $\eta$ for Alice to transmit a biphoton that is modulated with a polarization bit and delay byte pair in bin t is $\eta<1$. For each time bin, Alice encodes a random polarization bit p(t), a random delay byte d(t), and a random basis choice b(t). Bob then selects his own random basis choice b'(t) and makes a measurement of biphoton detection events p'(t) during a corresponding interval, accounting for propagation time. With 50% probability, Bob made the same basis choice as Alice, b'(t)=b(t), in which case p'(t)=p(t) and d'(t)=d(t). If Bob makes the opposite basis choice as Alice (50% probability), ½ the polarization bits cannot be detected since the members of the pair went in opposite detector arms, ¼ are correctly detected, p'(t)=p(t), and ¼ are incorrectly detected. This gives an overall detection probability for the polarization bits of $6\eta\eta'/8$, $5\eta\eta'/8$ of which are correct, p'(t)=p(t), and $\eta\eta'/8$ are incorrect. If Bob reports back to Alice via a public channel the subset $\{t_1\}$ that gave detected events ($\{t_1\}$ should be $6\eta\eta'/8$ the size of the set $\{t\}$), Alice can then transmit publicly to Bob the set of her basis choices $\{b(t_1)\}$, which he can compare with his basis choices $\{b'(t_1)\}$ and a refined data set $\{t_2\}$ with b'($t_2$)=b($t_2$) publicly agreed upon. If no eavesdropper has intruded, then ⅔ of the basis choices should agree, giving a valid data transfer probability per time bin of $\eta\eta'/2$.

If an eavesdropper, Eve, employs an attach whereby she measures and retransmits any sequence p''(t), d''(t) that she receives with her random basis choice b''(t), then the polarization bits p'(t) received by Bob are affected in several ways, such as depicted in Table 1. In Table 1, "B&A" stands for Bob and Alice, "E&A" stands for Eve and Alice, the terms "agree" and "disagree" refer to the basis for a particular biphoton, whether imparted or measured, as the case may be. The terms "correct," "blank" and "incorrect" refer to whether a particular polarization bit is measured correctly, not at all, or incorrectly, respectively. Each fraction in Table 1 represents a probability of the corresponding event depicted by its corresponding column and row. Note that a polarization bit is not detected at all if the signal photon and idler photon of a single biphoton travel to different detectors 115, 110. The total transmitted probability per time bin is $5\eta\eta'\eta''/8$, which is smaller than without Eve. This is even true if $\eta''=1$. More definitively, the ratio of the number of time bins where Bob and Alice choice of basis agree/disagree falls from 2/1 without Eve to 3/2 with Eve. Finally, the error rate that Bob sees for the data in set $\{t_2\}$ rises from zero to ⅙. Thus, statistical analysis of any of these parameters will serve to reveal the presence of Eve. An important feature here is that Bob can have a relatively low efficiency $\eta'$ and still defeat an Eve with perfect efficiency $\eta''=1$.

TABLE 1

| | with eavesdropper | | | | without eavesdropper | | |
|---|---|---|---|---|---|---|---|
| B & A | agree | agree | disagree | disagree | | | |
| E & A | agree | disagree | agree | disagree | B & A | agree | disagree |
| correct | 1/4 | 1/16 | 1/16 | 1/16 | correct | 1/2 | 1/8 |
| blank | | 1/8-not sent | 1/8 | 1/8 | blank | | 1/4 |
| incorrect | | 1/16 | 1/16 | 1/16 | incorrect | | 1/8 |

If Eve's efficiency $\eta''$ is small, then she can only intercept a portion $\eta''$ of the data set $\{t_2\}$. If Eve reintroduces the data she does detect into the undetected data stream, then the evidence of her tampering will be reduced (prob/bin($t_1$)=$\eta\eta'$ $(6(1-\eta'')+5\eta'')/8$; basis ratio=$2(1-\eta'')+1.5\eta''$; error rate $\eta''/6$). Such a partial-transparency attack can be foiled in a number of ways (e.g. combining pairs of data points from set $\{t_2\}$, to reduce the intercept rate to $\eta''^2$, etc.). However, unlike, for example, the protocol BB84, further sacrifice of valid data is not necessary for this method. If the data set $\{t_2\}$ is N bits long then the basis ratio $2-\eta''/2$ can be used to test for partial intercept down to the $\eta''=(72/N)^{1/2}$ level (this is assuming that background rate in the detector, which could mimic Eve in this ratio, is small b<<$\eta\eta'\eta''/2$).

By comparison, BB84 with single photons has no change in data rate or basis choice ratio. Thus, real data must be sacrificed to determine the error rate which is 1/8 for opaque intercept as noted below in Table 2.

TABLE 2

| BB84 | | | | | | | |
|---|---|---|---|---|---|---|---|
| | with eavesdropper | | | | without eavesdropper | | |
| B & A | agree | agree | disagree | disagree | | | |
| E & A | agree | disagree | agree | disagree | B & A | agree | disagree |
| correct | 1/4 | 1/8 | 1/8 | 1/8 | correct | 1/2 | 1/4 |
| blank | | | | | blank | | |
| in-correct | | 1/8 | 1/8 | 1/8 | incorrect | | 1/4 |

However, with $2^n$ regions in the linear array of BSM 120 in detectors 110 and 115, the protocol of FIG. 3 delivers n additional bits of information encoded in the time delay between signal photons and idler photons and sent with the same security as outlined above. The protocol of FIG. 3 is thus superior to BB84.

Figure 4:
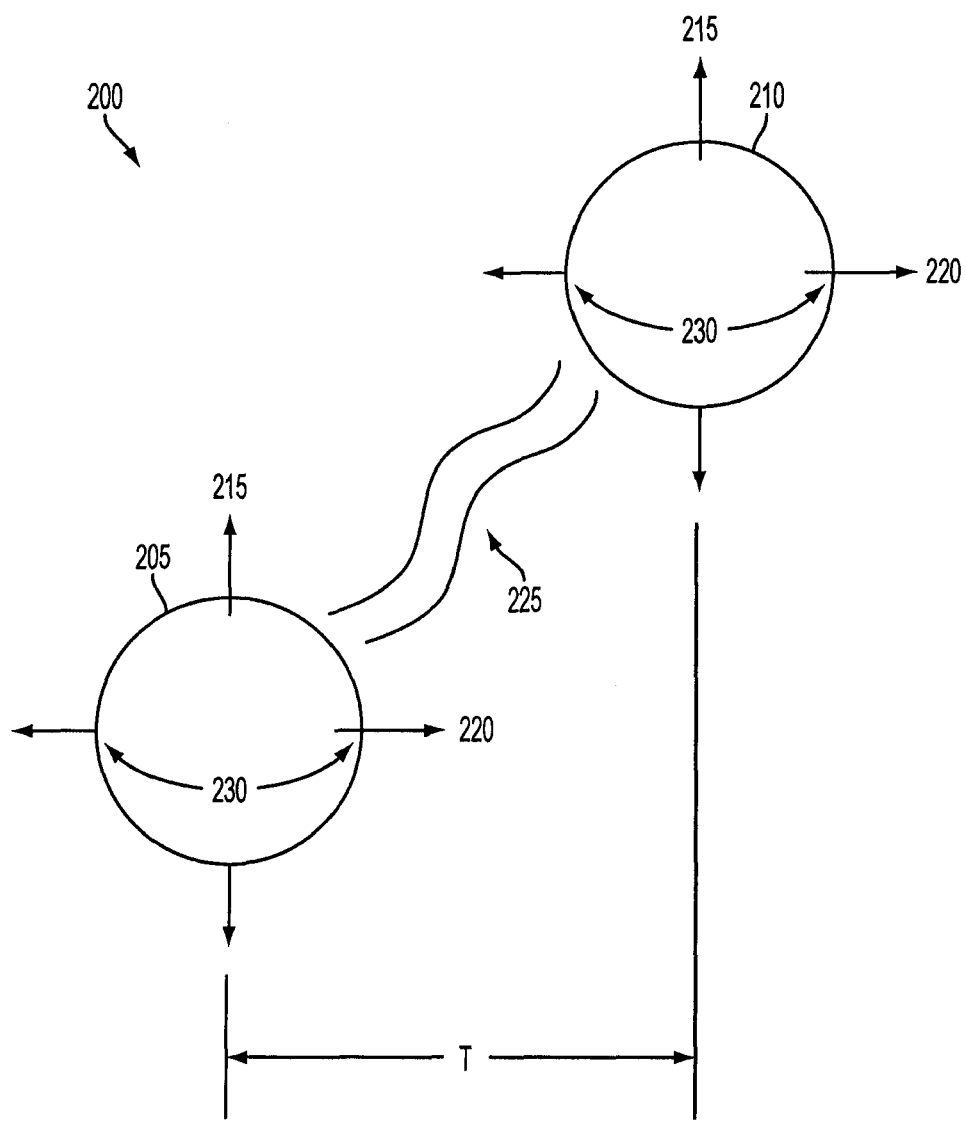
FIG. 4 is a schematic diagram illustrating a biphoton encoded with a bit and delay byte.

FIG. 4 illustrates a biphoton 200 having a basis, a polarization bit, and delay byte. Biphoton 200 is composed of an idler photon 205 and a signal photon 210. Biphoton 200 is produced with type II parametric down conversion and has an entanglement time $T_e$. Photons. 205 and 210 preferably have slightly different frequencies. Each photon 205 and 210 may have a vertical polarization 215 or a horizontal polarization 220. Depending upon the horizontal polarization 220 and the vertical polarization 215 of photons 205 and 210, biphoton 200 may represent a classical bit of "0" or "1." Through using polarizations 215 and 220, biphoton 200 can represent a bit of information. This bit of information is encoded onto biphoton 200 through the use of polarization selector 60.

Photons 205 and 210 are entangled, which is represented with wavy lines 225. This entanglement persists between photons 205 and 210 even when photons 205 and 210 are separated using a polarizing beam splitter (e.g., 45), given a selected polarization by a polarization selector (e.g., 60), imposed with a basis by a sender basis selector (e.g., 65) and pass through a receiver basis selector (e.g., 80), independent of whether the basis selector (e.g., 80) is activated or not.

Photons 205 and 210 may also have a circular polarization 230, depending on the choice of basis. Circular polarization 230 may be imparted onto biphoton 200 through the use of a basis selector (e.g., 65). Biphoton 200 may or may not have circular polarization 230 depending upon the random selection of the basis selector (e.g., 65).

The delay byte is imprinted upon biphoton 200 through the introduction of time delay T separating photon 205 from 210. The time delay T may be imparted to the biphoton 200 through the use of a photon delay (e.g., 55). Note that each biphoton 200 has an inherent entanglement time $T_e$. The time delay T is generally longer than the entanglement time $T_e$.

Figure 5:
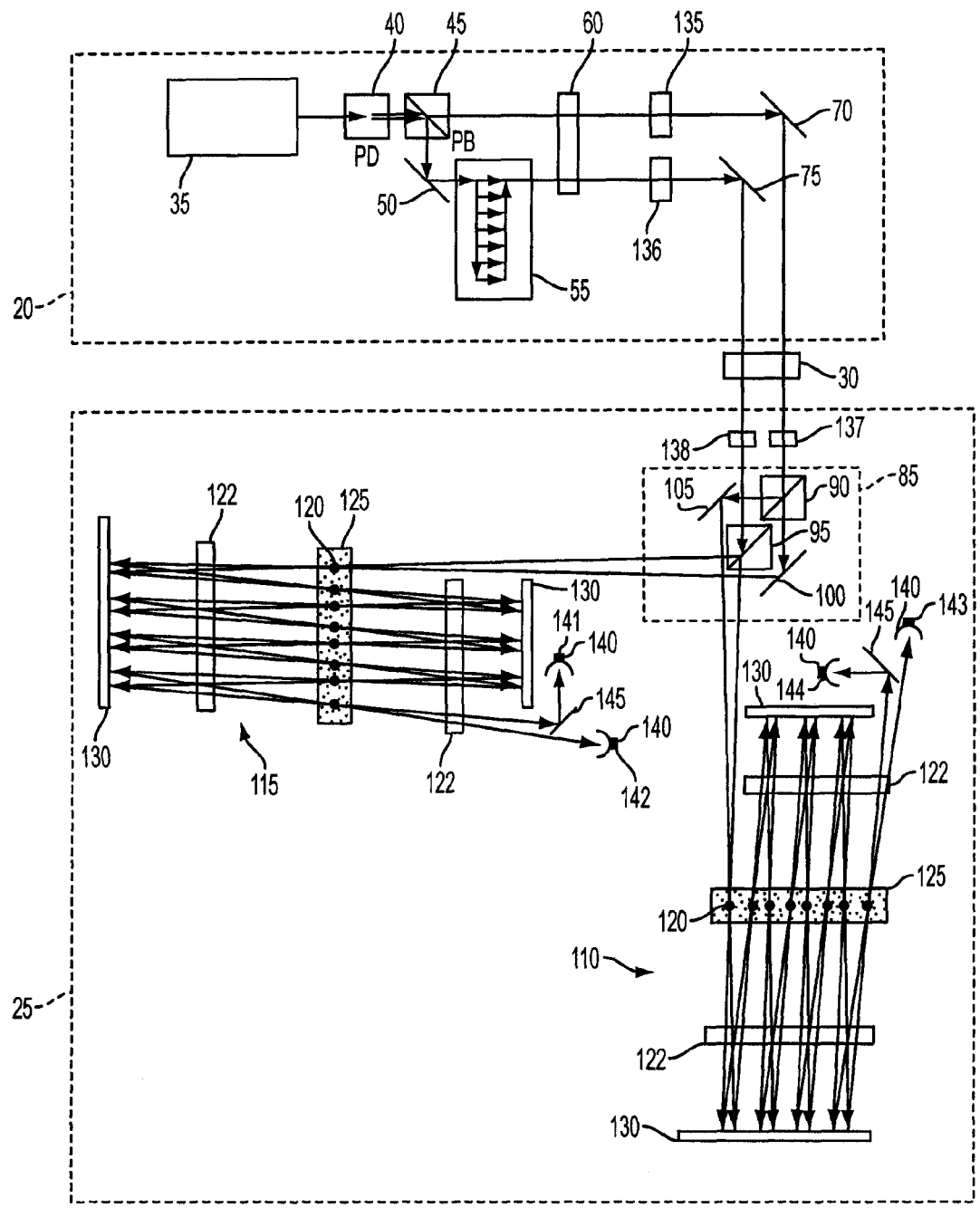
FIG. 5 is a block diagram of a second exemplary quantum key distribution embodiment.

FIG. 5 illustrates a block diagram of another quantum key distribution embodiment. This embodiment has two basis selectors 135 and 136 within sender 20. Basis selectors 135 and 136 are able to impart separate basis polarizations to the idler and signal photons. In order to detect the separate basis polarizations of the idler and signal photons imparted by basis selectors 135 and 136, receiver 25 of the this embodiment has a pair of basis selectors 137 and 138 that independently randomly guess at the polarization basis of the incoming biphoton transmitted by sender 20. In addition, this embodiment has coincidence detectors 140 coupled to a mirror 145 for each detector 110 and 115. If both photons have either vertical or horizontal polarization, the photons are detected by coincidence detectors 140. Thus, if a signal photon goes through detector 110 and its entangled idler photon goes through detector 115, or vice versa, a coincidence will be detected between detectors 141 and 143 or between detectors 142 and 144. Such a situation may occur, for example, when basis selectors 137 and 138 selecting a wrong basis, or from interference from Eve. Coincidence detectors 140 are coupled to a computer to record detection events, as are detectors 110 and 115 as described above in reference to FIG. 1.

Coincidence detectors 140 enable receiver 25 to determine a ratio of the number of biphotons detected by BSM regions 120 to the number of biphotons that are detected by coincidence detectors 140. More particularly, this ratio is computed by adding the numbers of detection events that occur in BSM 120, the number of coincidences between events detected at detectors 141 and 142, and the number of coincidences between events detected at detectors 143 and 144, and dividing the resulting sum by the sum of the number of coincidences between events detected at detectors 141 and 143 and the number of coincidences between events detected at detectors 142 and 144. Statistical analysis of this ratio is one method of determining whether an eavesdropper Eve is present. Without the presence of an eavesdropper, the ratio of biphotons detected with BSM regions 120 to those detected with coincidence detectors 140 is three-to-one. When Eve makes an opaque intercept, the ratio of biphotons detected with BSM regions 120 to those detected with coincidence detectors 140 becomes about five-to-three. The use of coincidence detectors thereby provides a method for statistically detecting Eve without revealing information about the key.

Figure 6:
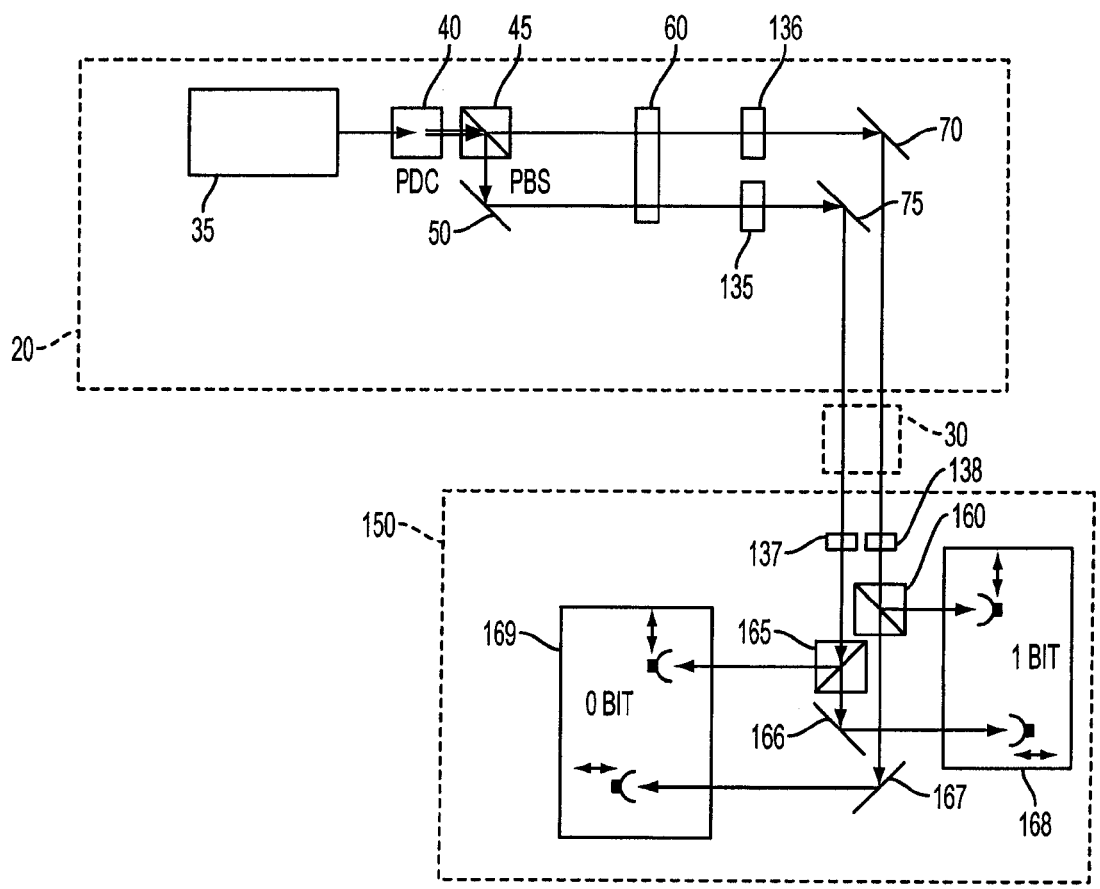
FIG. 6 is a block diagram of a third exemplary quantum key distribution embodiment.

FIG. 6 is a block diagram of a further embodiment of the invention. This embodiment of the invention does not include a photon delay (e.g., 55). In this system, the biphotons are encoded with a polarization bit ("1" or "0") by polarization selector 60, and no delay byte is encoded. This embodiment includes separate basis selectors 135 and 136 in sender 20 such that the idler and signal photons have individual polarization bases. Consequently, receiver 150 has two basis selectors 137 and 138 in order to randomly select the basis for the idler and signal photons incoming from sender 25. Polarizing beam splitters 160 and 165 separate the signal and idler photons based upon whether they are encoded with a "1" bit polarization or a "0" bit polarization in combination with mirrors 166 and 167. Detectors 168 and 169 register when a biphoton impacts the detector. In the embodiment of FIG. 6, detectors 168 and 169 may be either detectors incorporating a BSM or may be standard electronic coincidence counters.

Figure 7:
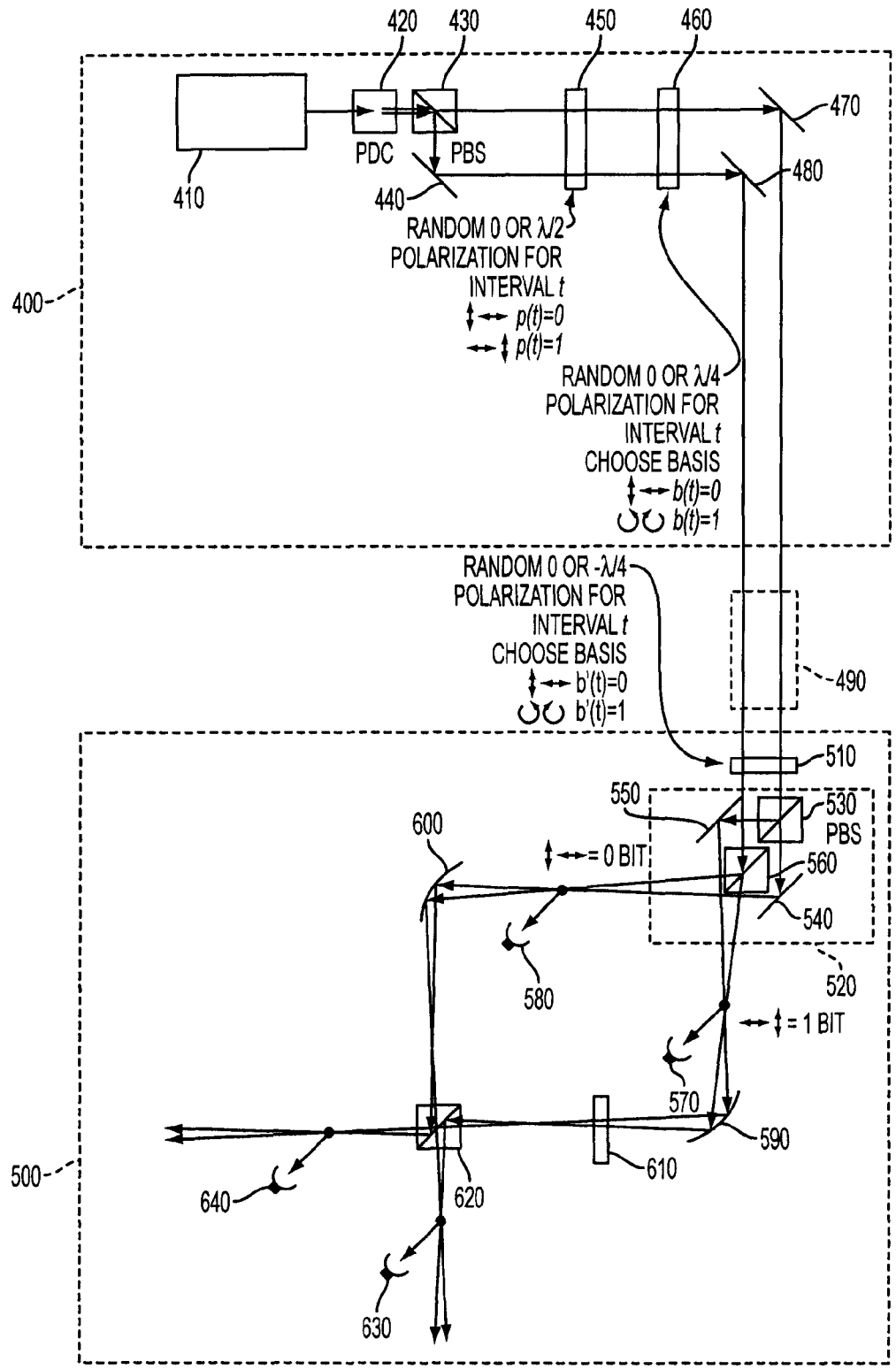
FIG. 7 is a block diagram of a fourth exemplary quantum key distribution embodiment.

FIG. 7 is a block diagram of a further embodiment of the invention. This embodiment is configured with a sender 400 that has a laser 410 and PDC 420 that produce biphotons. PBS 430 separates the idler photon from the signal photon so that they may propagate on different pathways. A mirror 440 reflects one of the photons of the biphoton in a pathway toward polarization selector 450. Polarization selector 450 imparts a bit of information onto both the signal and idler photons through manipulation of the photon's polarization. Basis selector 460 imparts a basis onto the biphoton through manipulation of the photon's polarization. Mirrors 470 and 480 direct the photons into channel 490.

The biphotons propagate through channel 490 to receiver 500. Receiver 500 is configured with a basis selector 510 to randomly guess at the basis of the incoming biphotons. Photon system 520 uses a pair of PBSs 530 and 560 along with a pair of mirrors 540 and 550 to separate and direct the biphotons to either the "1" bit detector 570 or the "0" bit detector 580. Mirror 590 directs the "1" bit biphotons to a Pockel cell or half-wave plate 610, which imparts a $\lambda/2$ phase shift to each photon passing through (converting vertical polarization to horizontal polarization and vice versa). Mirror 600 directs the "0" bit biphotons directly to PBS 620. PBS 620 separates and directs the incoming biphotons to biphoton detectors 640 and 630.

With the system illustrated in FIG. 7, receiver 500 can examine the ratio of biphotons detected by detectors 570 and 580 to biphotons that are detected by detectors 630 and 640. Without an eavesdropper present in the system, the ratio should be 3:1. If an eavesdropper Eve intercepts and retransmits, the ratio becomes approximately 5:3. Statistical analysis of this ratio thereby reveals the eavesdropper. Each of detectors 570, 580, 630, and 640 use a BSM and a fluorophoton monitor, such as a CCD or PMT. Each of detectors 570, 580, 630, and 640 are coupled to a computer, which monitors and records detection events. The same computer preferably reports the above ratio to a user of the system and suggests whether an eavesdropper is present.

Through the public channel, receiver 500 reports to sender 400 the bases of the biphotons and the number of biphotons that coincide. For each occurrence of coincidence, about one in every three pairs that Eve intercepts will be from the set where sender 400 and receiver 500 agree on the basis, making Eve's presence quickly apparent. As a result, there is an eavesdropping check with this system that does not reveal any information on the data that will be used for the key distribution.

Figure 8:
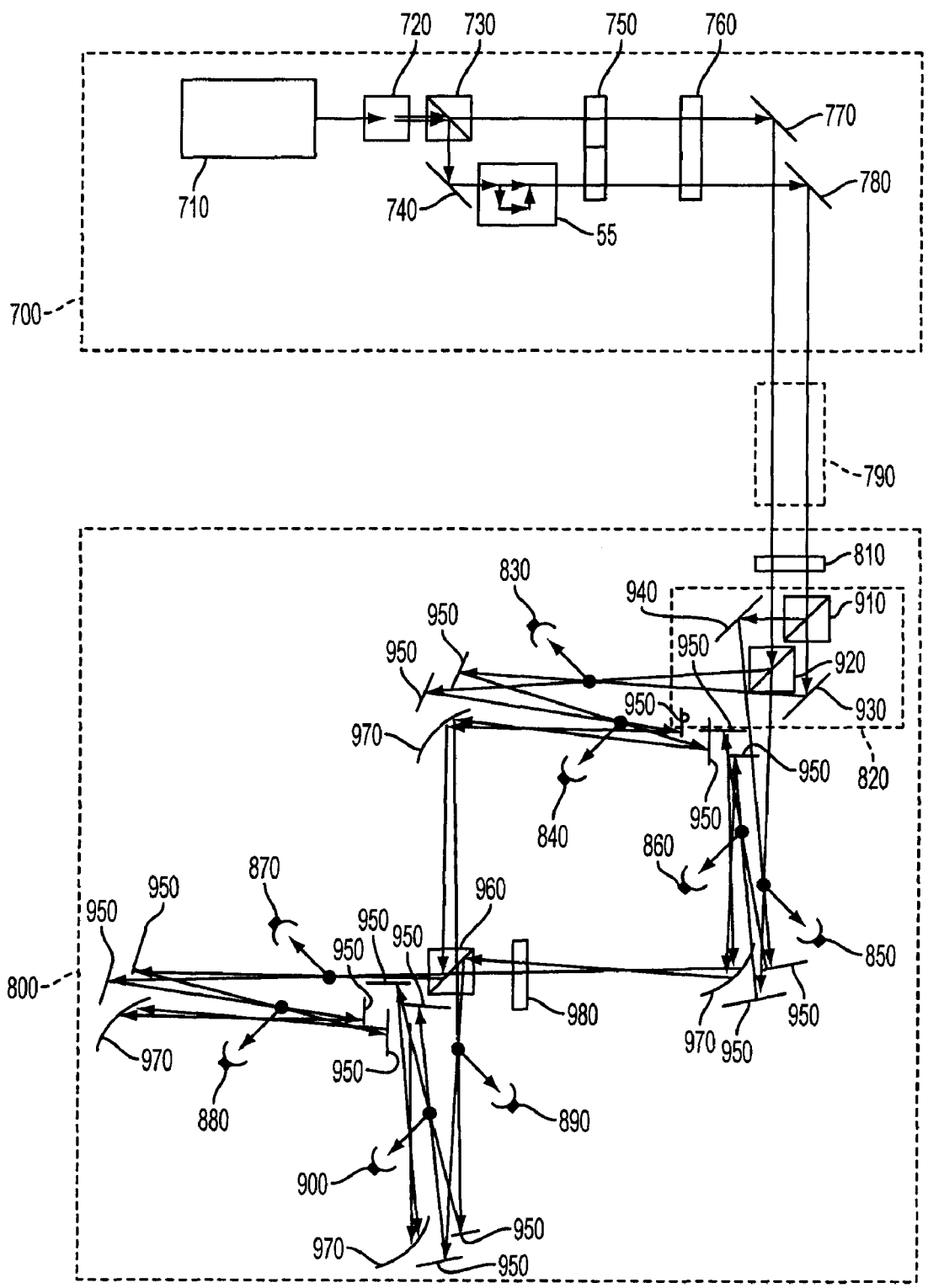
FIG. 8 is a block diagram of a fifth exemplary quantum key distribution embodiment.

FIG. 8 is a block diagram of another embodiment of the present invention. This embodiment is configured to support one bit of time delay coding. A sender 700 has a laser 710 and PDC 720 that produce biphotons. PBS 730 separates the idler photons from the signal photons so that they may propagate on different pathways. A mirror 740 reflects the idler photon toward photon delay 55 while the signal photon of the biphoton propagates in a pathway toward polarization selector 750. Photon delay 55 imparts a randomly-chosen time delay byte (in this embodiment, one bit) to the biphoton. After imparting the time delay byte, photon delay 55 directs the idler photon to polarization selector 750. Polarization selector 750 is divided into two sections so that it may separately impart polarizations onto the signal and idler photons. Polarization selector 750 is therefore able to impart two bits of information onto the biphoton through manipulation of each of the signal and idler photons' polarizations. Basis selector 760 randomly imparts a circular basis or leaves the existing linear basis on the biphoton. Mirrors 770 and 780 direct the photons into channel 790. The configuration of sender 700 to send a single bit of time delay information is purely exemplary. It is possible to encode and send additional bits of time delay information through the use of the appropriate photon delay 55.

The biphoton propagates through channel 790 to receiver 800. Receiver 800 is configured with a basis selector 810 to randomly guess at the basis of the incoming biphotons. Receiver 800 is configured to receive a biphoton with one bit of time delay and two polarization bits. With a total of three bits of information on the biphoton (not counting the basis choice), there are eight possible combinations. As a result, receiver 800 is provided with eight detectors 830, 840, 850, 860, 870, 880, 890, and 900 to detect the eight possible bit combinations. Each detector uses a BSM and a fluorophoton monitor, such as a CCD or PMT. Each such monitor is coupled to a computer, which records detection events and analyzes data using statistical methods, for example, as described below. The same computer preferably presents results to a user. The eight detectors 830, 840, 850, 860, 870, 880, and 900 are grouped in pairs (830, 840), (850, 860), (890, 900), and (870, 880) in order to detect the two possible delays of each polarization configuration. The four pairs of grouped detectors are organized as such to detect the four possible states of the two polarization bits.

Photon system 820 uses a pair of PBS devices 910 and 920 along with a pair of mirrors 930 and 940 to separate and direct the biphotons to one of the first two pairs of detectors, 830 and 840, or 850 and 860. Detectors 830 and 840 both detect the first of the four possible combinations represented by the two bits of polarization information. Detectors 850 and 860 both detect the second of the four possible combinations represented by the two bits of polarization information. Detectors 830 and 850 detect the first of the two possible states of the time delay bit. Detectors 840 and 860 detect the second of the two possible states of the time delay bit.

Two additional pairs of detectors, 870 and 880, and 890 and 900, are provided to detect the third and fourth possible combinations of the two bits of polarization information on the biphoton. The pair of detectors 870 and 880 are configured to detect the third of the four two-bit polarization states. The pair of detectors 890 and 900 are configured to detect the fourth of the four two-bit polarization states. Detectors 870 and 890 detect the first of the two possible states of the single time delay bit. Detectors 880 and 900 detect the second of the two possible states of the single time delay bit. The configuration of receiver 800 to receive a single bit of time delay information is purely exemplary. It is possible to detect additional bits of time delay information through the use of additional detectors. Alternately, the embodiment of FIG. 8 may omit photon delay 55 and detectors 840, 860, 880, and 900, in which case no time delay information would be encoded or detected.

Flat mirrors 950 are provided to direct the path of propagation of the signal and idler photons through the array of detectors 830, 840, 850, 860, 870, 880, 890, and 900. PBS 960 is provided between the first pairs of detectors, 830 and 840, and 850 and 860, and the second pairs of detectors 870 and 880, and 890 and 900. PBS 960 is provided to separate the signal and idler photons into the third and fourth possible states in the two-bit polarization information. Curved mirrors 970 are provided to direct the path of photons from the first pairs of detectors, 830, 840, 850 and 860 to the second pairs of detectors 870, 880, 890, and 900. Curved mirrors 970 are also provided to direct the photons to additional detectors if desired (not shown). A half-wave plate 980 is provided to rotate the polarization of the signal and idler photons λ/2 between the first and second pairs of detectors.

Figure 9:
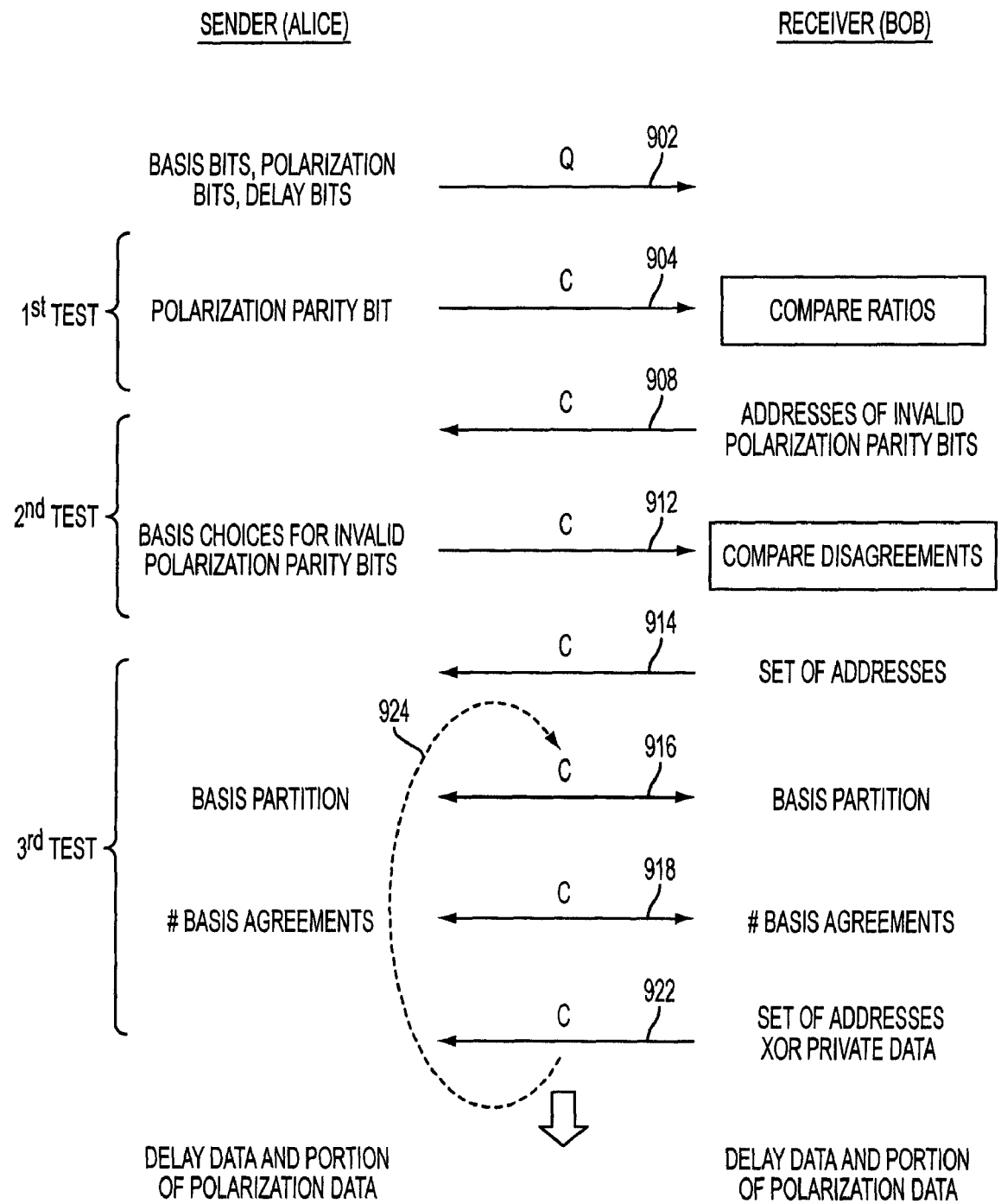
FIG. 9 is a schematic diagram illustrating a protocol for quantum key distribution.

FIG. 9 is a schematic diagram illustrating a quantum key distribution protocol. Consider the system of FIG. 8 in usage. Assume for purposes of exposition that the efficiency of detecting a given biphoton can be low (efficiency η' for receiver 800 Bob and η" for an eavesdropper Eve, not shown). The transmission of biphotons occurs over a period of time that is broken into individual time bins of width $\Delta T$ labeled in sequence by an integer t, thereby comprising a set {t} identified with the time bins. The probability for Alice, the sender 700, to transmit a biphoton in a given bin t is $\eta < 1$. Since Alice generally cannot control when a biphoton is produced, she preferably limits her transmission rate so that most intervals are empty (by way of non-limiting example, sent biphoton probability per interval has η equal to about 0.1). For each time bin t, Alice encodes two random polarization bits p(t) with polarization selector 750, one random delay bit d(t) with photon delay 55, and a random one bit basis choice b(t) with basis selector 760. (Note that the use of a single time delay bit d(t) is purely exemplary. The information encoded on the time delay may comprise any number of bits.) Alice then sends 902 these packets of bits, each encoded in a single biphoton, to Bob through communications channel 790. (In FIG. 9, the letter "Q" designates a quantum communication, and "C" designates a classical communication. It is contemplated that any information transmitted on classical channels may alternately, or in addition, be transmitted on a quantum channel.)

Bob selects his own random one-bit basis choice b'(t) and takes a measurement of biphoton detection events p'(t), d'(t) with detectors 830, 840, 850, 860, 870, 880, 890, and 900. Bob makes these measurements during a corresponding set of time intervals of width $\Delta T$, adjusted to account for propagation time and labeled {t}, as above. If Bob happens to choose the same basis b(t) as Alice for a biphoton in some time bin t, then Bob will measure the same data that Alice sent in that packet for polarization and delay, i.e., p(t)=p'(t) and d(t)=d'(t). The probability that Bob chooses the same basis as Alice for a particular packet is 50%. Likewise, the probability that Bob chooses a different basis from Alice is 50%. When Bob chooses a different basis, the signal photon and idler photon each have a $(1/2)^{1/2}$ quantum wave function amplitude to be transmitted and reflected from their respective polarizing beam-splitter. This distribution of amplitudes results in the detection of the biphoton, with equal probability (¼), in one and only one of the four detection regions that have the correct delay. Regardless of what basis Bob chooses, he will measure the correct delay d(t)=d'(t), and this is independent of which polarization bits were encoded. On the other hand, if Bob chooses the incorrect basis, his two measured polarization bits p'(t) will be random, with 25% probability of measuring each of the four possibilities for p'(t).

The probabilities of what Bob measures when Alice sends a particular biphoton in the embodiment of FIG. 8 are given below in Table 3. In Table 3 "B&A" is short for Bob and Alice. "E&A" is short for Eve and Alice. The abbreviations "cor" and "inc" are used in place of correct and incorrect. The pairs (cor, cor), (inc, inc), (cor, inc), and (inc, cor) denote whether the polarizations of the signal and idler photons, respectively, are measured correctly or incorrectly. By associating the symbols 0, 1, 2, and 3, with each of the four possibilities of the two polarization bits p(t), Table 3 also illustrates the particular case of what happens when Alice sends a biphoton with a polarization that corresponds to 0. The fractional numbers represent the probabilities of occurrence for the situation corresponding to the row and column in which the fraction occurs. That is, when Bob measures something in a particular time bin, Table 3 represents the probabilities of the various outcomes. Thus, the sum of the probabilities (for each of the "with eavesdropper" and "without eavesdropper" portions of Table 3) is one. For example, the probability that Bob and Alice disagree on their basis, Bob correctly measures the signal photon polarization p(t) and incorrectly measures the idler photon polarization p(t) in the absence of an eavesdropper is ⅛. Note that, regardless of Bob's choice of basis, he will correctly detect the delay byte, d'(t)=d(t). Thus, Table 3 does not depict the results of measuring the delay byte.

TABLE 3

Probabilities for what Bob receives when Alice sends p(t) = 0

| | with eavesdropper | | | | without eavesdropper | | |
|---|---|---|---|---|---|---|---|
| B & A<br>E & A | agree<br>agree | agree<br>disagree | disagree<br>agree | disagree<br>disagree | B & A | agree | disagree |
| (0)cor, cor | 1/4 | 1/16 | 1/16 | 1/16 | (0)cor, cor | 1/2 | 1/8 |
| (1)inc, inc | | 1/16 | 1/16 | 1/16 | (1)inc, inc | | 1/8 |
| (2)cor, inc | | 1/16 | 1/16 | 1/16 | (2)cor, inc | | 1/8 |
| (3)inc, cor | | 1/16 | 1/16 | 1/16 | (3)inc, cor | | 1/8 |

The first part of Table 3 represents the probabilities of detection events in the presence of an eavesdropper, Eve. If Eve is an opaque eavesdropper, i.e., she retransmits any signal that she measures as p''(t) with her random basis choice b''(t), then the data received by Bob is affected as represented in the first part of Table 3. Such an opaque eavesdropper performs what is known as a measure-and-resend attack.

Bob has an overall detection probability per time bin of $\eta\eta'$. Note that there may be many time intervals in the set $\{t\}$ for which Alice did not transmit a biphoton. The subset of $\{t\}$ consisting of the packets for which Bob has a measurement is designated as $\{t_B\}$.

With the sacrifice of privacy of one of the polarization bits, it is possible to test the security of the remaining two bits (the other polarization bit and the delay bit) with any, or a combination, of the following three exemplary tests. After the quantum data are sent by Alice and received by Bob, Alice publicly transmits 904 a parity bit for each time bin $\{t_B\}$, e.g., whether the polarization choices for the signal photon and idler photon are the same or different.

One security test for the embodiment of FIG. 8 has Bob using the parity bit to determine whether to expect valid data in $p(t_B)=0$ or 1, or in $p(t_B)=2$ or 3 where 0, 1, 2, and 3 are the four possible combinations of the two polarization bits. Without Eve's presence, only about ¼ of the data received by Bob should be invalid, i.e., have a parity different from what Alice transmitted. If Eve is an opaque eavesdropper, ⅜ of the data will be invalid (this ⅜ths corresponds to the $3^{rd}$, $4^{th}$, and $5^{th}$ columns of the last two rows in Table 3, each of which contains a 1/16 probability). A beam-splitter attack by Eve (also known as a partially opaque or partially transparent attack) gives a probability of invalid data in subset $\{t_B\}$ of $(2+\eta'')/8$, where $\eta''$ is Eve's intercept-to-resend ratio. Such a beam-splitter attack is performed by Eve by placing a beam-splitter in the quantum transmission channel between the receiver and sender in order to read the information. By statistically analyzing Bob's invalid detections, a measure-and-resend or beam-splitter attack may be detected.

A second security test for the embodiment of FIG. 8 is described presently. Bob reports back to Alice via a public channel the subset $\{t_1\}$ of $\{t_B\}$ that gave invalid detected events. That is, Bob reports 908 the addresses of incorrect polarization parity data. Alice then transmits 912 publicly to Bob the set of her basis choices $\{b(t_1)\}$, which Bob can compare with his basis choices $\{b'(t_1)\}$. In the absence of Eve, all of the basis choices in $\{b(t_1)\}$ should disagree with those in $\{b'(t_1)\}$. Thus, this test almost completely thwarts detect and resend (opaque eavesdropper) attacks. With Eve partially intercepting and retransmitting data, $b(t_1)=b'(t_1)$ events should arise with an approximate probability of $\eta''/3$. Accordingly, an arbitrarily small intercept rate $\eta''$ can be detected, limited only by random dark counts or noise in Bob's detector. At this point in the process, the security of the quantum data is highly assured and no information about the ultimate data set (the non-public bit of p(t)=p'(t), and d(t)=d'(t) for a particular choice of t) has been publicly revealed, including the set of time bins $\{t_V\}$ in which valid data were received. In addition, multiple accidental biphotons in one time bin do not give a false eavesdropper indication.

A third security test for the embodiment of FIG. 8 is discussed presently. This test is especially useful to foil a beam-splitter attack. By performing this test, Alice and Bob will have common knowledge of the subset of $\{t_B\}$ in which they share a common basis. Bob publicly transmits 914 a set $\{t_{V1}\}$ of thirty addresses randomly-chosen from $\{t_V\}$ (the addresses of valid parity bits in their corresponding biphotons) to Alice. The corresponding basis and data bits ($b(t_{V1})=b'(t_{V1})$, $p(t_{V1})=p'(t_{V1})$ and $d(t_{V1})=d'(t_{V1})$) are secure as assured by the above tests. About two-thirds of $\{t_{V1}\}$ (about twenty) will have agreeing basis choices $b(t_{V1})=b'(t_{V1})$. Denote this set by $\{t_{FI}\}$. Alice and Bob share much more information about $b(t_{V1})$ and $b'(t_{V1})$ than Eve has. These bases are either linear or circular with equal probability. Alice and Bob can find the subset $\{t_{FI}\}$ of time bins with agreeing bases while revealing little about the basis choices that they made as follows.

Alice divides $\{t_{V1}\}$ into the two subsets $\{t_{V1AL}\}$, $\{t_{V1AC}\}$ corresponding to her basis choices, linear or circular, respectively. Bob also divides $\{t_{V1}\}$ into the two subsets $\{t_{V1BL}\}$, $\{t_{V1BC}\}$ corresponding to his basis choices, linear or circular, respectively. Alice and Bob then each publicly reveal 916 the addresses of one of their respective sets ($\{t_{V1xL}\}$ or $\{t_{V1xC}\}$), chosen at random, without revealing which set it is, where the subscript "x" is to be read as "A" or "B," corresponding to Alice's set or Bob's set. The ratio of agreeing basis choices will be about ⅔. This is because each of these sets is a subset of $\{t_V\}$, the time bins that have valid parity bits. (The time bins $\{t_V\}$ comprise about ¾ of the total set $\{t_B\}$ of events detected by Bob. One-third of any subset of $\{t_V\}$ will correspond with valid parity bits but incorrect basis. The other two-thirds of any such subset of $\{t_V\}$ will correspond to accurately measured parity bits, i.e., parity bits measured using the correct basis.) Thus, both Alice and Bob can determine which subset, $\{t_{V1xL}\}$ or $\{t_{V1xC}\}$, was revealed by the other using statistical analysis. Bob can also determine Alice's basis choices $b(t_{V1})$ for all thirty members of $\{t_{V1}\}$ by process of elimination. Both Alice and Bob thereby determine $\{t_{F1}\}$.

To check for transmission errors or dark noise, Bob and Alice publicly agree 918 on the number of bins in $\{t_{V1}\}$ in which their bases agree (which will be about twenty). If they agree, Alice and Bob can be confident that they have the same data subset, that is, know that their bases agree on those about twenty bits in $\{t_{F1}\}$.

The parties can use secret data from $\{t_{V1}\}$ to select the time bins of the next thirty addresses $\{t_{V2}\}$. This leads to a bootstrap address selection technique. For example, Bob can use the thirty basis bits from $\{t_{V1}\}$ to select the addresses of a next set of thirty randomly-chosen time bins $\{t_{V2}\}$. Alternately, or in addition, Bob can use a number (e.g., $\log\{t\}$) of the polarization bits from $\{t_{V1}\}$ to select the addresses $\{t_{V2}\}$. To accomplish this, Bob randomly selects thirty addresses from $\{t_V\}$. Bob then performs an XOR operation on each chosen address with the secret data taken from $\{t_{V1}\}$. Bob publicly transmits 922 the results of the thirty XOR operations to Alice, preferably in the same sequential order in which he selected them. Alice can decode the addresses selected by Bob because she shares the secret data from $\{t_{V1}\}$. Eve, acting as a passive receiver of accidental multiple biphotons, can generally (e.g., if $\eta<0.1$) receive at most one or two of the thirty basis bits, and cannot even determine either the basis choices for these bits or which of the thirty addresses they represent. Thus, Eve has virtually no idea what bins are referred to when the data in $\{t_{V2}\}$ are determined.

The bootstrap process of encoding the addresses of the next group of thirty time bins $\{t_{VN}\}$ for $N=3, 4, \ldots$ proceeds 924 as described above until all of $\{t_V\}$ has been determined. In general, the parties may use secret data from a given $\{t_{VN}\}$ to select the addresses of the next $\{t_V(N+1)\}$. The final set $\{t_F\}$ is the union of each $\{t_{Fi}\}$ for $i=1, 2, \ldots$. Eve knows at most $\{t_{V1}\}$, so these are discarded. Additionally, the parties share two enumerations of $\{t_F\}$: the natural, sequential enumeration, and the enumeration defined by Bob's random address selection. Thus, in this latter enumeration (which may be denoted $\{t_{F'}\}$), the order is randomized. Note that the numbers thirty and twenty are exemplary only; other numbers may be used. In particular, the sizes of each $\{t_{VN}\}$ may be any number.

In summary, if the number of bins in the entire time sequence $\{t\}$ is on the order of $2^{30}$ (about $10^9$), then the number of bins in $\{t_B\}$, the set received by Bob, will be about $10^7$, the number of bins of totally usable data $\{t_F\}$ (i.e., the bins in which both Alice and Bob agree on the bases) will be about $5\times10^6$, and Eve will have about six bits of data if she launches a measure-and-resend attack and less than one bit knowledge of which bin corresponds to which intercepted data bit for either eavesdropping attack, measure-and-resend or beam-splitter.

The parties may perform error correction on the sets $\{t_F\}$ and $\{t_{F'}\}$. In particular, parity checks on the data in $\{t_{F'}\}$ can find and correct errors in $\{t_F\}$. To accomplish this, parity information may be sent in the ordering of $\{t_{F'}\}$ so as to correct errors. Hashing and a divide-and-conquer technique may then be used to detect and correct errors in $\{t_F\}$. The secure enumeration $\{t_{F'}\}$ minimizes the number of bits that must be dropped to make the parity checks secure. Because most errors may be caught when forming the secure enumeration and because the addresses themselves are highly secure, little secret data must be sacrificed to correct any remaining errors.

Encoding the time bin sets $\{t_{VN}\}$ helps to foil a potential beam-splitter attack. If Eve does not retransmit any of the data that she intercepts with efficiency $\eta''$, then she can read off those rare events in which two (or more) biphotons were transmitted in the same time bin, which occurs with a probability of about $\eta^2$. Since the usable data bit transfer rate is $(1+n)\eta\eta'/2\Delta T$, $\eta$ is preferably made as large as possible consistent with foiling a beam-splitter attack. For example, if $\eta=0.1$, $\eta''=0.1$, and $\eta'=0.01$, then $\eta\eta''=0.01$ of Bob's received data is also detected by Eve along with 999 times as much data not seen by Bob. Thus, on average about $10\eta\eta''/4=0.025$ bits of the 10 bits in $p'(t_F)=p(t_F)$ are available to Eve. As the amount of data transmitted increases, less information is available to Eve in this strategy. Eve is not aware of which $t_V$ was employed in a publicly reported $b(t_V)=b'(t_V)$, much less for the resultant $p'(t_V)=p(t_V)$ and $d(t_V)=d'(t_V)$.

Any, or a combination of, the data $d(t_V)=d'(t_V)$ and the non-publicly disclosed polarization portion of $p'(t_F)=p(t_F)$ may be used to form the secure quantum key. All of $\{t_B\}$, and $\{b(t_B)\}$, and $\{b'(t_B)\}$ are now known to both Bob and Alice, but not to Eve. All of the subset $\{t_F\}$ of $\{t_B\}$ that has $b'(t)=b(t)$ (about half) will also be known to Alice and Bob. If no eavesdropper has intruded, then ⅔ of the basis choices should agree, while giving a valid biphoton transfer probability per time bin of $\eta\eta'/2$.

The protocol described above in reference to FIGS. 8 and 9 is capable of distributing a quantum key that is secure against both beam-splitter and detect/resend attacks with high data rates. Data rate increases arise from both including delay bits and increasing the time bin occupancy $\eta$. These capabilities stem from the extra information that can be included on a biphoton and the ability to measure this information by an exclusive two-photon transition that detects and destroys the pair together or not at all.

A modification of the third security test of the protocol discussed above in reference to FIGS. 8 and 9 is disclosed presently. Instead of Alice partitioning $\{t_{V1}\}$ into $\{t_{V1AL}\}$ and $\{t_{V1AC}\}$ corresponding to her basis choices, and Bob dividing $\{t_{V1}\}$ into $\{t_{V1BL}\}$ and $\{t_{V1BC}\}$ corresponding to his basis choices, the parties construct and share different partitions. As discussed above in reference to FIG. 1, it is possible to identify each basis choice with a bit value. Such bit values may be operated on by logical operators. In particular, the bit value for a given basis choice may be combined (using, e.g., XOR) with a secret bit to produce a masked basis bit value. Such a secret bit may be encoded on the same entangled photons to which the basis bit it masks is associated. Alternately, the secret bit may come from a different set of entangled photons. Thus, each of Alice and Bob may share a scheme for selecting a sequence of secret bits used to produce masked basis bits. Preferably, the shared scheme for selecting secret bits chooses secret bits primarily from entangled photons other than the entangled photons encoded in the basis to be masked. Once all of the basis bits are masked using secret bits from the transmitted entangled photons, Alice and Bob partition $\{t_{V1}\}$ based on the masked basis bits. Alice may partition $\{t_{V1}\}$ into $\{t'_{V1AL}\}$ corresponding to the addresses whose masked bit value is "0", and $\{t'_{V1AC}\}$ corresponding to the addresses whose masked bit value is "1". Similarly, Bob may partition $\{t_{V1}\}$ into $\{t'_{V1BL}\}$ corresponding to the addresses whose masked bit value is "0", and $\{t'_{V1BC}\}$ corresponding to the addresses whose masked bit value is "1". Because Alice and Bob share the scheme by which they select the masking bits, Alice can determine which subset, $\{t'_{V1BL}\}$ or $\{t'_{V1BC}\}$, was revealed by Bob, and Bob can determine which subset, $\{t'_{V1AL}\}$ or $\{t'_{V1AC}\}$, was revealed by Alice. Alice and Bob are both able to recover $\{t_{V1AL}\}$, $\{t_{V1AC}\}$, $\{t_{V1BL}\}$, and $\{t_{V1BC}\}$. As with the first version of the third security test above, Bob can also determine Alice's basis choices $b(t_{V1})$ for all thirty members of $\{t_{V1}\}$ by process of elimination. Both Alice and Bob thereby determine $\{t_{F1}\}$. As in the first version of the third security test, this process is extended to $\{t_{VN}\}$ for N=3, 4, . . . by a bootstrap technique. The present modified third security test has the benefit of withholding virtually all basis choice information from Eve.

Embodiments of the present invention in which a plurality of bits are encoded into a single entangled photon set have certain benefits. In these embodiments, each entangled photon set encodes at least one bit that may be used as shared secret information, and at least one extra bit that may be used for other purposes. Such extra bits may be used for, by way of non-limiting example, information selection (e.g., address selection), information masking (e.g., address masking), error detection, error correction, and/or privacy amplification. The protocols discussed above in reference to FIGS. 8 and 9 and modifications thereof use extra bits for exemplary such purposes. For example, according to the embodiments of FIGS. 8 and 9, the basis choices are never explicitly revealed in public. In the modified third security test, the basis choices are masked by bits encoded on biphotons, without using all of the bits on such biphotons for masking purposes. As a further example, the addresses in which Bob received data are not explicitly publicly revealed. Because Bob receives data only in about one in one thousand time bins, it is advantageous over Eve to keep secret the addresses of time bins in which Bob detects data. The bootstrap address selection techniques discussed herein mask these addresses using bits present in biphotons, again without using all of the bits on any one biphoton for such masking purposes. As yet another example, techniques discussed herein allow for the reuse of publicly-revealed parity bits, if desired, because the addresses of the biphotons on which these parity bits are present are masked. Thus, the plurality of bits encoded on each biphoton may be used for both error correction and other uses; the parity bits need not be sacrificed.

In some embodiments of the present invention, the signal and idler photons are polarized at right angles with respect to each-other in the communication channel. In other embodiments, the relative orientation of the signal and idler photons in the communications channel may be parallel or may vary biphoton-to-biphoton. It is also contemplated that a single stream of photons, including both the signal photons and the idler photons, may be used in the communications channel. In such embodiments, the signal and idler photons may be interleaved in a regular or irregular fashion.

Embodiments of the present invention that employ two (or more) basis choices may use various different bases. By way of non-limiting example, embodiments that employ either circular or linear basis choices may instead use two different forms of linear basis choice. Two exemplary, non-limiting linear basis choices include the following. A first linear basis choice for polarization may include as two of its states: photons polarized at 0° and photons polarized at 90°. Such polarization states may be represented as "|" and "-", with the basis represented as "+". A second linear basis choice for polarization may include as two of its states: photons polarized at 45° and photons polarized at 135°. Such polarization states may be represented as "/" and "\", with the basis represented as "x". Any combination of two or more bases chosen from the two exemplary linear basis choices and a circular polarization basis may be used in various embodiments of the present invention. For any two given bases, each basis may be identified with a particular bit value to produce a basis bit.

In some embodiments of the present invention, the random bits required at various stages by both the sender and the receiver may be generated by a pseudorandom number generator, such as modular exponentiation, or may be truly random, such as bits generated from a radioactive source, weather patterns, radio-frequency noise, or other sources. As used herein, the term "random number generator" includes both truly random and pseudorandom number sources. Among the various stages, different or identical random number generators may be used.

Various embodiments of the present invention typically employ standard computer hardware, firmware, or software for various functions. Such functions include, by way of non-limiting example: controlling photon delays (e.g., 55), controlling basis selectors (e.g., 65), controlling polarization selectors (e.g., 60), receiving and processing data from random number generators and conveying random information to various components, calculating numerical indications of eavesdropping (e.g., as described in the first, second and third security tests referred to above in reference to FIG. 8), performing statistical analysis of eavesdropping numerical indications, receiving and processing detection information (e.g., from detectors 115 and 110), and outputting key information. Standard computer software programming techniques may be used in combination with hardware and/or firmware.

As used herein, the term "public channel" refers to any communications channel whose secrecy for the particular data in question is not essential. Such a public channel may include portions of quantum channel(s) and/or classical channel(s). The term "private channel" refers to any communications channel whose secrecy for the particular data in question is desirable. Such a private channel is typically a quantum channel in embodiments of the present invention.

Embodiments of the present invention may employ various configurations of senders and receivers. Typically, each entity in a given communications system includes both a sender and a receiver as described herein. Known techniques for sending and receiving light energy may be used. Such techniques include, but are not limited to, the use of collimating optics and telescopes. Transmission from one terrestrial point to another terrestrial point, from one terrestrial point to a vehicle, from a vehicle to a terrestrial point, or between vehicles is contemplated. In addition, transmission between a terrestrial point or vehicle and a satellite in Earth's orbit is also contemplated.

In embodiments of the present invention, the designation of information states corresponding to binary bits zero (0) or one (1) is arbitrary. That is, in any embodiment as described herein, the bit value of zero (0) may be interchanged with the bit value of one (1) as long as such interchange is done consistently.

Many quantities described herein are probabilistic. Thus, such quantities must be viewed as being typical, yet subject to variation. Such quantities include actual measured indicia of eavesdropping. Further, most of the observations and measurements discussed herein are subject to noise of various forms from various sources. Probabilistic quantities are typically subjected to statistical analysis, known in the art, to ascertain their reliability and assist in drawing conclusions.

As used herein, the term "encode" means to manifest information in some physical entity in some way, with a non-zero probability of retrieval. Such physical entities include electromagnetic radiation, electrical signals, and storage media. The term "modulate" may be used to describe encoding information into biphotons as discussed herein.

Entangled photons may be produced according to a variety of methods. By way of non-limiting example, entangled photons may be produced according to types I or II parametric down-conversion. Furthermore, any nonlinear crystal, not limited to BBO, may be used. Other ways to produce entangled photons include: excited gasses, materials without inversion symmetry, and generally any properly phase-matched medium. Furthermore, the entangled photons are not limited to any particular wavelength or frequency. Biphotons whose constituent signal and idler photons are orthogonally polarized may be used as well as biphotons whose constituent signal and idler photons are polarized in parallel.

In some embodiments of the present invention, various indicia of entangled-photon absorption may be used to detect entangled photons. By way of non-limiting example, entangled-photon absorption may result in fluorescence, phosphorescence, direct electron transfer, or ionization of the absorbing material. Detecting fluorescence, phosphorescence, direct electron transfer, or ionization may be used to detect entangled-photon absorption. Also by way of non-limiting example, avalanche photodiodes, photo multiplier tubes (PMT), or other devices may be used to detect the fluorophotons, ionization, direct electron transfer, or other absorption indicia.

In addition to the techniques disclosed herein, steganography may also be employed. By way of non-limiting example, quantum steganography may be combined with embodiments of the present invention. See U.S. patent application Ser. No. 10/849,789, filed May 21, 2004, entitled "Quantum Steganography" to Conti et al. In addition, or in the alternative, non-quantum steganography may be combined with the present invention. By way of non-limiting example, the frequency of the laser that produces entangled photons may be modulated with information, which may be decoy information.

Embodiments of the present invention may include information in entangled photons by modulating the frequency of the laser that produces the entangled photons. The sum frequency of each biphoton is thereby encoded with information. In such embodiments, the receiver is modified to allow for detecting various sum frequencies, which may be accomplished, by way of non-limiting example, using a magnetic field gradient along a BSM. Such embodiments allow for serial information detection, in that a BSM region configured to absorb a particular sum frequency will allow entangled photons not of that sum frequency to pass. Information encoded in sum frequencies may take the place of, or supplement, the information encoded in inter-biphoton delay.

For the embodiments described herein, portions of one embodiment may be substituted, replaced, or inserted into other embodiments. That is, the teachings disclosed herein should be viewed collectively, with each embodiment capable of employing technologies drawn from other embodiments.

In embodiments of the present invention disclosed herein, the signal photon may be switched with the idler photon and vice-versa without affecting the overall operation. That is, the embodiments are not completely dependent on which photon is labeled "signal" and which is labeled "idler."

In some embodiments of the present invention, multiply-entangled photons may be used. Multiply-entangled photons are three or more photons entangled together. By way of non-limiting example, entangled photon triples (three photons entangled together) or quadruples (four photons entangled together) may be used. Multiply-entangled photons consisting of greater than four photons may also be used. Those of ordinary skill in the art will appreciate that the techniques disclosed herein may be used to encode information in multiply-entangled photons. The term "entangled photons" refers to both multiply-entangled photons and to entangled photon pairs.

In some embodiments of the present invention, standard electronic coincidence counters may be used in place of detectors that incorporate a BSM, e.g., where transparency of detectors is not required. Such electronic coincidence counters use a pair of single-photon detectors and logic to correlate arrival time and thus detect potential biphotons. By way of non-limiting example, in the embodiment of FIG. 7, a substitution of standard electronic coincidence counters may be made for detectors 630 and 640. In that embodiment, electronic coincidence counters may be substituted for detectors 570 and 580, with a loss of detectible information. Electronic coincidence counters may also be used to detect delays. Thus, for example, electronic coincidence counters may be substituted for detectors 110 and 115 in the embodiment of FIG. 1. Certain losses of information may require modification of the associated protocol when substituting electronic coincidence counters for detectors that employ a BSM.

The particular optical manipulation devices depicted herein are illustrative and representative and are not meant to be limiting. By way of non-limiting example, prisms, apertures, filters, optical fiber, lenses, and particular lasers disclosed herein may be replaced with devices known to those of ordinary skill in the art.

Embodiments of the present invention may employ optics other than polarizing beam splitters to separate signal photons from idler photons. By way of non-limiting example, the downconverted beam containing signal photons and idler photons may be directed to a pair of apertures, which select beams that respectively include signal photons and idler photons. Such apertures may be formed according to techniques taught in Boeuf et al., *Calculating Characteristics of Non-collinear Phase-matching in Uniaxial and Biaxial Crystals* (draft Aug. 27, 1999), available from the National Bureau of Standards. By way of non-limiting example, apertures at ±3° from the laser polarization direction may be used. Interference filters may further distill signal photons and idler photons from the light that passes through the apertures.

While the invention has been shown and described with reference to a particular embodiment thereof, it will be understood to those skilled in the art, that various changes in form and details may be made therein without departing from the spirit and scope of the invention.

What is claimed is:

1. A system comprising an electronic computer for distribution of private information, the system comprising:
   a sending unit configured to encode at least one bit onto at least two photons and send the at least two photons to a receiving unit, the at least two photons comprising a first photon and a second photon, the at least two photons being entangled together, the at least one bit being encoded in a time delay between a propagation of the first photon and the second photon, the sending unit further configured to randomly select and impart a basis polarization on the at least two photons; and
   a receiving unit comprising an electronic computer configured to correctly detect the at least one bit on the at least two photons transmitted from the sending unit regardless of a basis polarization used to measure the at least two photons at the receiving unit, the receiving unit further configured to determine basis polarization information based on at least three received messages.

2. The system of claim 1 wherein the receiving unit is configured to detect the at least one bit in the presence of ambient light.

3. The system of claim 1, wherein the at least one bit is cryptographic key information.

4. The system of claim 1, wherein the sending unit is configured to impart a bit polarization to the first photon and the second photon.

5. The system of claim 1, wherein the receiving unit further comprises at least one coincidence detector.

6. The system of claim 4, wherein the coincidence detector comprises a biphoton sensitive material.

7. A transmission unit comprising an electronic computer for communicating private information, comprising:
 a generator for creating a plurality of entangled photon sets;
 time delay optics that introduces, for each entangled photon set, a relative time delay between a first photon and a second photon comprising the entangled photon set;
 a basis polarizer comprising an electronic computer that selects a polarization basis for the entangled photon set, wherein the basis polarizer randomly imparts one of a linear polarization and a circular polarization on the entangled photon set;
 optics configured to transmit the plurality of entangled photon sets to a receiver configured to detect the relative time delay regardless as to a polarization basis used to measure the entangled photon sets; and
 an electronic computer configured to calculate information relating to a basis polarization of each of the plurality of entangled photon sets received by the receiver and information relating to a matching basis for a subset of the plurality of entangled photon sets received by the receiver.

8. A computer implemented method for communicating secret information, comprising:
 generating a plurality of entangled photons;
 introducing, using an electronic computer, a time delay between the propagation of two photons, wherein the time delay represents at least one bit of information, and wherein the two photons are entangled with each other;
 randomly imparting a basis polarization on the two photons;
 transmitting the plurality of entangled photons;
 correctly detecting the time delay on received entangled photons regardless as to a basis polarization used to measure the received entangled photons; and
 forming cryptographic information from the at least one bit of information;
 wherein the cryptographic information is used for an operation selected from the group consisting of: encryption, decryption, key distribution, and authentication.

9. The method of claim 8, further comprising the step of imparting a separate basis polarization to each photon comprising the entangled photons.

10. A computer implemented method of communicating private information, comprising:
 transmitting, using an electronic computer, a first message over a private channel comprised of a plurality of sets of photons entangled together, each set of the sets of photons encoded with a time delay representing at least one bit, each of the sets of photons imparted with a randomly selected basis polarization, the transmitting being to a receiver configured to correctly measure the at least one bit encoded in each of the sets of photons regardless of basis polarizations used to measure the sets of photons;
 transmitting a second message over a public channel relating to a basis polarization of each of a subset of the sets of photons entangled together received by a receiver; and
 transmitting a third message over the public channel relating to a matching basis for a subset of the sets of photons entangled together,
 wherein the private channel includes the presence of ambient light.

11. A system comprising an electronic computer for providing parties with common secret information, the system comprising:
 means for producing entangled photons;
 means for encoding information in a delay time of the entangled photons resulting in encoded entangled photons;
 means for randomly imparting a basis polarization on the encoded entangled photons;
 means for sending the encoded entangled photons;
 means for receiving the encoded entangled photons;
 means for detecting the delay time encoded in received encoded entangled photons regardless of a basis polarization used to measure the received entangled photons;
 means for testing security of at least a portion of information encoded in received encoded entangled photons;
 means for forming a common set of secret information derived at least in part from at least a portion of information encoded in the encoded entangled photons; and
 means for performing at least one function selected from the group consisting of: detecting eavesdropping, detecting errors, amplifying privacy, and masking information.

12. A system comprising an electronic processor for establishing shared secret information, the system comprising:
 a source of entangled photon sets, each entangled photon set comprising a first photon and a second photon, the first photon being entangled with the second photon;
 optics configured to encode each of a plurality of entangled photon sets with a plurality of bits in a time delay to produce a first quantity of entangled photon sets;
 optics configured to randomly impart a basis polarization on each of the plurality of entangled photon sets;
 optics configured to transmit at least some of the first quantity of entangled photon sets to a receiver, the receiver configured to correctly detect the plurality of bits regardless as to a basis polarization used to measure the plurality of entangled photon sets;
 an electronic processor configured to calculate evidence of interference based at least in part on bits detected by the receiver on a second quantity of entangled photon sets; and
 an electronic processor configured to establish shared secret information derived at least in part from bits encoded on the second quantity of entangled photon sets;
 wherein the shared secret information is used for an operation selected from the group consisting of: encryption, decryption, key distribution, and authentication.

13. The system of claim 12, wherein the plurality of bits comprise at least three bits.

14. The system of claim 12, wherein the plurality of bits comprise at least four bits.

15. The system of claim 12, wherein the plurality of bits comprise at least five bits.

16. A computer implemented method of establishing shared secret information, the method comprising:

producing entangled photon sets, each entangled photon set comprising a first photon and a second photon, the first photon being entangled with the second photon;

encoding each of a plurality of entangled photon sets with a plurality of bits in a delay time to produce a first quantity of entangled photon sets;

randomly imparting a basis polarization on each of the plurality of entangled photon sets;

transmitting at least some of the first quantity of entangled photon sets to a receiver, wherein the receiver is configured to correctly detect the plurality of bits regardless as to a basis polarization used to measure the plurality of entangled photon sets;

calculating, using an electronic computer, evidence of interference based at least in part on bits detected by the receiver on a second quantity of entangled photon sets; and establishing shared secret information derived at least in part from bits encoded on the second quantity of entangled photon sets;

wherein the shared secret information is used for an operation selected from the group consisting of: encryption, decryption, key distribution, and authentication.

17. The method of claim 16, wherein the step of encoding comprises encoding each of the plurality of entangled photon sets with at least three bits.

18. The method of claim 16, wherein the step of encoding comprises encoding each of the plurality of entangled photon sets with at least five bits.

* * * * *